United States Patent [19]

Buldini

[11] 4,089,017

[45] May 9, 1978

[54] AUTOMATIC PHOTOSTUDIO

[75] Inventor: Daniel A. Buldini, Melrose, Mass.

[73] Assignee: Polaroid Corporation, Cambridge, Mass.

[21] Appl. No.: 721,111

[22] Filed: Sep. 7, 1976

[51] Int. Cl.[2] .................... G03B 17/50

[52] U.S. Cl. .................... 354/81; 354/174; 354/290

[58] Field of Search .................... 354/75, 76, 81, 86, 354/92, 93, 150, 174, 180, 182, 290; 271/172, 268

[56] References Cited

U.S. PATENT DOCUMENTS

| | | | |
|---|---|---|---|
| 3,744,390 | 7/1973 | Clark | 354/174 |
| 3,820,136 | 6/1974 | Kennedy | 354/81 |

*Primary Examiner*—L. T. Hix
*Assistant Examiner*—William B. Perkey
*Attorney, Agent, or Firm*—John S. Vale

[57] ABSTRACT

An automatic photostudio including an apparatus for changing film cassettes in a self-developing camera. The cassette changing apparatus includes a pair of cassette holding magazines located on opposite sides of the camera, an elevator for moving cassettes into and out of the camera, and a shuttle plate mechanism for effecting the dispensing of a cassette alternately from the first and second magazines and for moving the cassette along a guide plate to the elevator.

30 Claims, 14 Drawing Figures

10 ST-1 20 24 26 ST-3 36 34 ST-2 42 44 46 38 30 150 50 14 16 32 40 157 25 18 22 154 12 21 28

PHOTOCELL DETECTOR D
PHOTOCELL DETECTOR B

AUTOMATIC PHOTOSTUDIO

BACKGROUND OF THE INVENTION

1. Field of the Invention

The present invention relates to the field of photography and, more specifically, to automatic photostudios including film cassette changing apparatus.

2. Description of the Prior Art

Automatic, coin operated photostudios — or "photographic vending machines" — which are actuable by a user for taking self-portraits are well known in the prior art. Generally, these photostudios include a housing that is divided into a studio compartment where the user sits to be photographed and an adjoining apparatus compartment housing a portrait camera and associated film handling and processing equipment.

Upon actuating the photostudio, usually by inserting a coin, bill or token into a receiving mechanism or by other means such as actuating an electrical switch, the camera operates to photograph the user sitting in the studio compartment and then the exposed film unit is automatically processed and delivered to the user, via a delivery chute or slot, in a relatively short period of time.

The present invention relates to automatic photostudios which utilize self-developing film units supplied in film holding cassettes and include cassette changing apparatus for moving such cassettes into and out of operative relation with the camera.

Generally, such cassette changing apparatus include means for holding a supply of film cassettes and transfer means for moving a cassette from the supply into a camera cassette receiving receptacle, removing the cassette from the receptacle after the film units therein are expended, and replacing the removed empty cassette with a full cassette.

Of particular interest are the cassette changing apparatus wherein the means for holding a supply of cassettes include one or more vertically disposed gravity feed magazines configured to hold a stack of cassettes therein and the transfer means are configured to move the cassettes from the bottom of the stack laterally to a position beneath an open bottom camera receptacle and then up into the receptacle for locating the cassette in operative relation with the camera.

For example, U.S. Pat. Nos. 3,744,389 and 3,744,390 issued on July 10, 1973 to Charles W. Clark and U.S. Pat. No. 3,797,823 issued to Charles W. Clark on Mar. 19, 1974 disclose an automatic photobooth in which two vertically disposed cassette holding magazines are located adjacent one side of open bottom cassette receiving receptacle of the camera.

In operation, the cassettes are dispensed sequentially from the magazine furthest from the camera by a reciprocating mechanism and form a horizontally disposed train of cassettes extending from the bottom of the magazine to an aligned position on a cassette carrier or elevator beneath the camera receptacle. During each successive cassette changing cycle the train of cassettes is advanced forwardly one cassette position by the reciprocating mechanism. The cassette adjacent the elevator pushes the empty cassette off the elevator and takes its place for movement into the camera when the elevator is moved upwardly. The cassettes behind this cassette are moved up one position and another cassette is dispensed from the magazine to the last position in the train. After all of the cassettes in the furthest magazine have been dispensed, a dummy cassette is utilized to modify the operation of the transfer mechanism such that cassettes are dispensed from the second magazine, i.e., the magazine closest to the camera.

It will be noted that the cassettes that have been dispensed from the magazine to the horizontal train play an active part in the transfer operation by pushing the cassette ahead of it during portions of the transfer operation.

Another example of an automatic photostudio which includes such a cassette changing apparatus is disclosed in U.S. Pat. No. 3,820,136 issued to C. Bruce Kennedy on June 25, 1974, and assigned to the same assignee as the present invention.

In this system, the cassettes are held in a single vertically disposed magazine located to one side of the camera. The lowermost cassette in the stack rests on a horizontal guide plate which extends to a spring loaded tilting bed cassette carrier normally located in closing relation to the open bottom of the camera receptacle. When the film units in a cassette located in the receptacle have been expended, a solenoid is energized and pulls down on the bed causing it to tilt away from the receptacle opening thereby allowing the empty cassette to slide off of the bed for disposal. The solenoid is then deenergized causing the spring to return the bed to its normal position. A reciprocating mechanism then pushes the lowermost cassette in the stack from the magazine toward the cassette carrier bed. The cassette engages the bed and forces it down against the bias of the spring into a position wherein the cassette can enter the open bottom of the camera receptacle. The bed then moves upwardly under the spring bias to its normal position holding the cassette in its operative position within the receptacle. When the reciprocating mechanism returns to its starting position, all of the remaining cassettes in the magazine move down one position under the influence of gravity.

Again, the cassette plays an active part in the transfer operation in that it is utilized to force the carrier bed down from its normal position against the biasing force of the spring to gain entry into the camera cassette receiving receptacle.

The automatic photostudios are intended to be serviced at rather infrequent intervals and therefore it is important that the operating mechanisms, including the cassette changing apparatus, be as reliable as possible without making them too complex and therefore expensive to manufacture. The above-noted cassette changing apparatus both use the film cassettes to perform active functions connected with cassette transfer. In one case the cassettes are used to push preceding cassettes in the horizontal train towards the cassette carrier or elevator and displace an empty cassette therefrom. In the other apparatus, the cassette is used to force the carrier bed into a cassette receiving position against the biasing force of the carrier spring. Thus, the reliability of the cassette changing mechanism is to a certain extent dependent upon the cassettes being uniformly manufactured without taking into account possible manufacturing variances and minor dimensional changes that may be incorporated into the cassette at a later date.

For examples of other automatic photobooths that use self-developing film units, reference may be had to U.S. Pat. No. 3,821,760 and 3,852,783 wherein the film units are held in a single large capacity cassette and copending application Ser. No. 679,053 filed on Apr. 21, 1976 now abandoned which discloses a cassette changing apparatus wherein the cassettes are held in individual trays on an indexing conveyor rather than in gravity feed magazines.

SUMMARY OF THE INVENTION

The present invention provides an automatic photostudio which is actuable by a user for taking self-portraits and features a cassette changing apparatus for moving film cassettes holding self-developing film units into and out of operative relation with the studio camera. Advantageously, the film cassettes are transferred from film holding magazines to an open bottom camera receptacle without using the cassettes themselves for providing functions connected with the transfer process.

In a preferred embodiment, the cassette changing apparatus includes a pair of gravity feed cassette holding magazines disposed on opposite sides of the camera. Each magazine holds a stack of cassettes therein and has a bottom opening through which the cassettes are adapted to be sequentially dispensed. The magazines are arranged such that their respective bottom openings are adjacent and on opposite sides of the open bottom of the camera cassette receiving receptacle.

The cassettes are moved into and out of the receptacle by a cassette carrier or elevator car mounted below the camera with a cassette supporting elevator platform aligned with the bottom opening of the receptacle. The elevator car is mounted for movement, toward and away from the camera, between a first position closest to the receptacle wherein said elevator platform holds a cassette thereon in the receptacle in operative relation with the camera, a second position remote from the first position or furthest from the receptacle wherein the platform tilts for disposing of an empty cassette previously removed from the receptacle, and a third position, intermediate the first and second positions, for receiving a full cassette initially held in one of the two magazines for subsequent movement into the camera receptacle.

When the elevator is located in the intermediate or third position, the elevator platform is operatively located with respect to cassette guide means or a plate which extends outwardly from the elevator and beneath the bottom openings of the first and second magazines for receiving cassettes dispensed from the first and second magazines and for guiding the movement of these cassettes along the guide plate to the elevator platform.

The cassette changing apparatus further includes a shuttle plate mounted between the open bottoms of the magazines and the guide means for reciprocating movement relative thereto for selectively blocking and unblocking the bottom openings of the magazines to dispense cassettes alternately from the first and second magazines onto the guide plate and for moving the cassettes along the guide plate and onto the elevator platform located in its intermediate position.

Structurally, the shuttle plate is a thin elongated member having two adjacent substantially rectangular openings therein. When the shuttle plate is located in a first position, the first opening is aligned with the bottom opening of the first magazine allowing the lowermost cassette to be dispensed, by gravity, onto the guide plate therebelow and the second opening is aligned with the elevator platform and the camera receptacle allowing the elevator to move between its three positions. The end portion of the plate outboard of the second opening is located in blocking relation to the bottom opening of the second magazine thereby preventing a cassette from being dispensed therefrom.

When moved from its first position to its second position, the opposite end portion of the shuttle plate blocks the bottom opening of the first magazine, the first opening is aligned with the elevator platform and the camera receptacle and the second opening is located in unblocking relation to the bottom opening of the second magazine allowing the lowermost cassette therein to drop onto the guide plate.

Preceding the initiation of a cassette changing cycle, the elevator is in its first position holding a cassette up in the camera receptacle. Assume for now that the shuttle plate is in its first position. That means that the first magazine is unblocked and a cassette dispensed therefrom rests on the guide plate and is surrounded on its sides by a frame formed by the edges of the first opening in the shuttle plate. The elevator car extends up through the guide plate and the second opening in the shuttle plate to assume its first position and the bottom opening of the second magazine is blocked.

Upon receiving a signal from a photostudio logic system that the film cassette in the camera receptacle is empty, the elevator car moves downwardly toward the second position carrying the empty cassette on the platform. Once the platform and empty cassette pass below the guide plate, the elevator platform tilts as it approaches the second position causing the empty cassette to slide off and fall into a disposal bin. Upon reaching the second position, the elevator car reverses direction and moves upwardly towards the third of intermediate position. Along the way the elevator platform assumes its normal pack receiving orientation and the elevator stops at the third position with the platform being located in blocking relation to the opening in the guide plate.

The shuttle plate now moves from the first position to the second position. The cassette previously dispensed from the first magazine is moved along the guide plate by the frame defined by the first opening in the shuttle plate and onto the elevator platform. The second opening unblocks the bottom of the second magazine causing the lowermost cassette therein to be dispensed onto the guide plate and the bottom opening of the first magazine is blocked by the opposite end portion of the shuttle plate.

When the shuttle plate reaches the second position, the elevator moves upwardly from its cassette receiving third position to the first position to locate the cassette on its platform in the camera receptacle. A dark slide is then ejected from the cassette thereby terminating the cassette changing cycle.

It will be noted that the reciprocating shuttle plate moves only from one terminal position to the other terminal position during any cassette changing cycle. That is, during one changing cycle it moves from the first position to the second position. During the next changing cycle it moves from the second position back to the first position. In this manner, the shuttle dispenses the cassettes alternately from the first and second magazines rather than depleting the supply of cassettes in the first magazine and then switching to the second magazine. Thus, the cassette changing apparatus has the advantage of utilizing two magazines to increase its storage capacity without having to employ a very tall single magazine, yet there is no need for a complex switching mechanism which would be required if the first magazine was depleted of cassettes before switching to the second magazine.

Also, it should be noted that the cassettes play a passive rather than an active part in the transfer process. When one opening in the shuttle plate is aligned with the bottom opening of the magazine, the cassette drops down onto the guide plate. The frame formed by the shuttle plate opening slides the cassette laterally onto the elevator platform and the elevator car moves the cassette into and out of operative relation with the camera. Therefore the cassette does not push other cassettes during its lateral transfer from the magazine to the elevator nor does it engage and move any operating mechanism against the force of a biasing spring at any time during the transfer process.

Therefore it is an object of the present invention to provide an automatic photostudio including a cassette changing apparatus for moving film cassettes holding self-developing film units into and out of operative relation with a camera.

It is another object of the invention to provide a cassette changing apparatus including a pair of gravity feed cassette holding magazines disposed on opposite sides of an open bottom camera receptacle and means for dispensing the cassettes alternately from the magazines and moving the cassettes into and out of the camera receptacle.

It is yet another object to provide such a cassette changing apparatus including a cassette carrier or elevator being mounted for movement between a first position for holding a cassette in the camera receptacle, a second position remote from the first position for disposing of an empty cassette, and a third position, intermediate said first and second positions, for receiving a cassette, initially stored in one of said first and second means, for subsequent movement into the camera receptacle.

Another object is to provide such a cassette changing apparatus wherein the elevator includes a cassette support platform which tilts or is inclined as the elevator approaches its second position to allow an empty cassette to slide off of the platform for disposal.

Another object is to provide such a cassette changer which further includes a reciprocating shuttle plate for selectively blocking and unblocking the bottom openings of the two magazines to effect the dispensing of cassettes alternately therefrom and for moving the cassettes laterally along a guide plate to the cassette supporting platform of the elevator located in its third position.

Other objects of the invention will, in part, be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
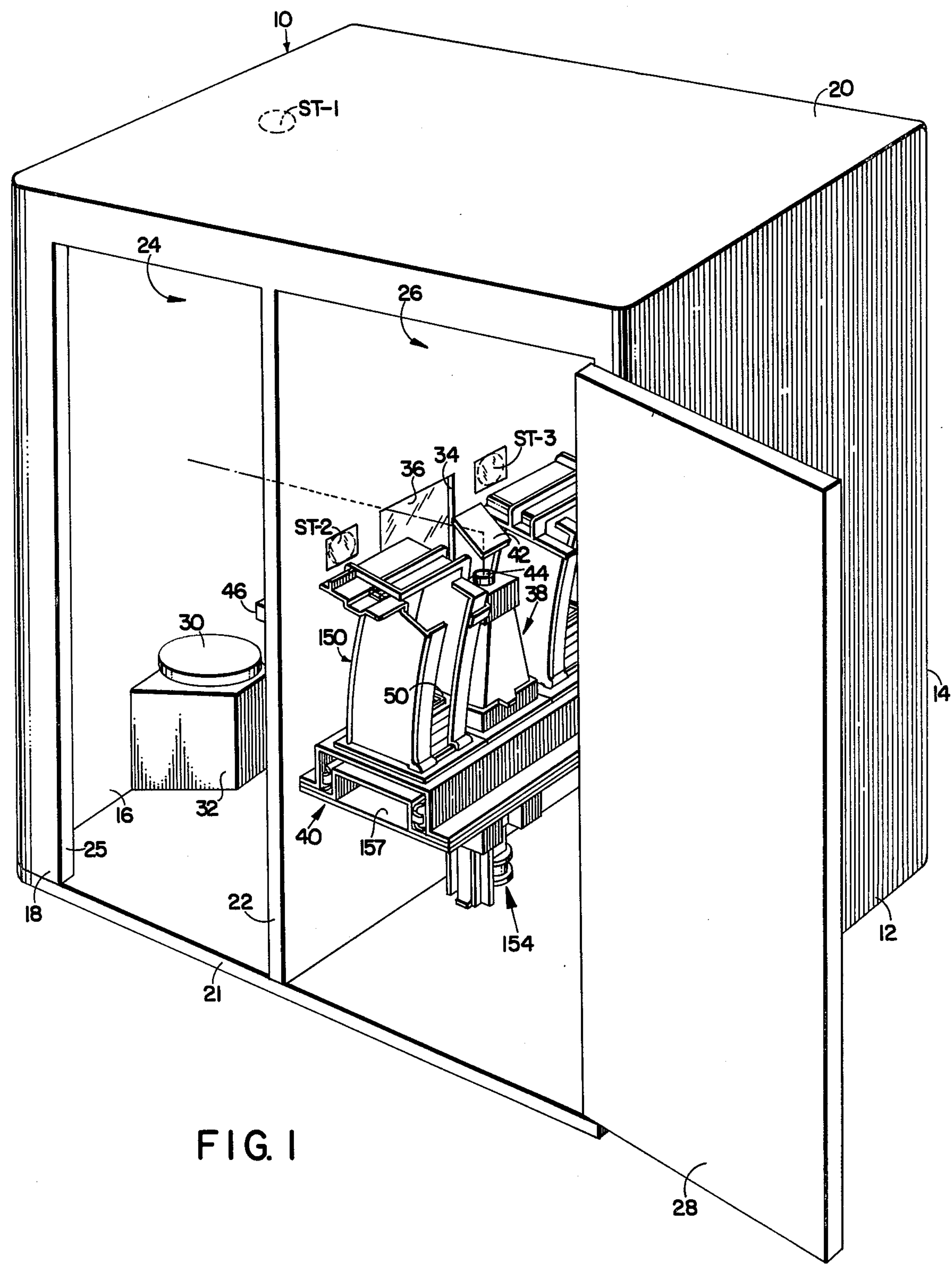
FIG. 1 is a perspective view of an automatic photostudio including a cassette changing apparatus embodying the present invention.

FIG. 1 of the drawings illustrates an automatic photostudio or photobooth embodying the present invention.

The photostudio includes a housing 10 formed by vertical side walls 12, 14, 16 and 18, a horizontal top wall or roof 20 and a horizontal bottom wall or floor 21. A vertical interior wall 22, extending between walls 14 and 18 and disposed in parallel relation to walls 12 and 16, divides housing 10 into a studio compartment 24 where the user sits to have his portrait taken and an apparatus compartment 26 which houses the automated apparatus for cassette changing, film exposure, processing and delivery of the film unit to the user, all of which will be described in detail later in the disclosure.

Access to the studio compartment 24 is provided by a doorway 25 in wall 18 which optionally may be provided with a door or curtain (not shown). The apparatus compartment 26 is accessible through an adjacent doorway closed by a door 28.

Studio compartment 24 includes therein a vertically adjustable stool 30, mounted on a base 32 or any other suitable support, on which the user sits facing a generally rectangular aperture or window 34 in wall 22. Window 34 is covered by a transparent glass plate or half-silvered mirror 36 which allows the user to view an image of himself thereon by reflection as well as allowing light transmission therethrough into compartment 26 for the purpose of making a photographic exposure of the user.

Located in apparatus compartment 26 is a portrait camera 38 for exposing and processing self-developing film units and a cassette handling or changing apparatus designated generally as 40 for moving cassettes holding a stack of self-developing film units into and out of operative relation with camera 38. Both camera 38 and apparatus 40 will be described in detail later on.

Camera 38 is disposed with its optical axis extending upwardly in a vertical direction and a mirror 42 is positioned above the camera objective lens 44 at an angle of 45° to the axis to define a folded optical path (shown in dotted lines) from the user seated on stool 30, through the transparent glass plate or half-silvered mirror 36 to mirror 42 and downwardly to the objective lens 44 of camera 38. In a preferred embodiment, a light excluding baffle structure and support for mirror 42 is provided between the apparatus compartment side of wall 22 around window 34 and lens 44, but it has not been shown in FIG. 1 for the sake of visual clarity.

To illuminate the subject during the exposure phase, the studio includes strobe type lighting units which are positioned in a known manner for facilitating portrait photography and operate in predetermined timed relationship with the camera shutter. Such strobe units are diagrammatically illustrated in FIG. 1 as ST1, ST2, and ST3.

In use, the user adjusts the height of stool 30 until an image of his head and shoulders is properly framed in window 34. He then deposits a coin, bill or token in a payment receiving device 46 (diagrammatically illustrated) mounted on the studio compartment side of wall 22 to actuate operation of the photostudio. The camera shutter and strobe units operate to photoexpose the forwardmost film unit in a cassette located in a cassette receptacle in camera 38. The exposed film unit is then advanced from the cassette, through a pair of pressure-applying members to initiate film development and into a delivery chute extending through wall 22 for delivery to the user.

Figure 5:
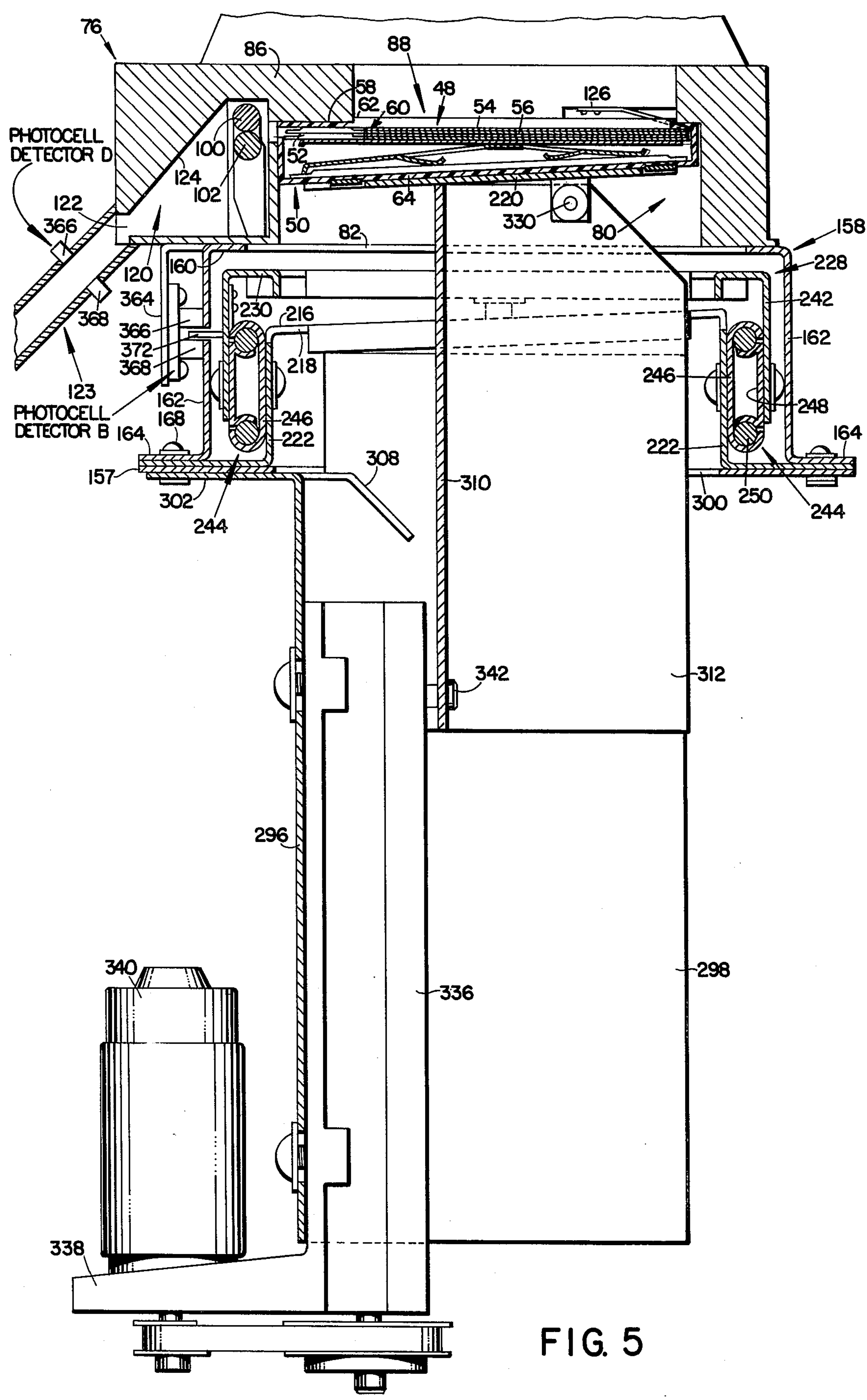
FIG. 5 is a left side sectional view of the cassette changing apparatus of FIG. 2 showing the elevator in its first position holding a cassette in the camera receptacle.
Figure 6:
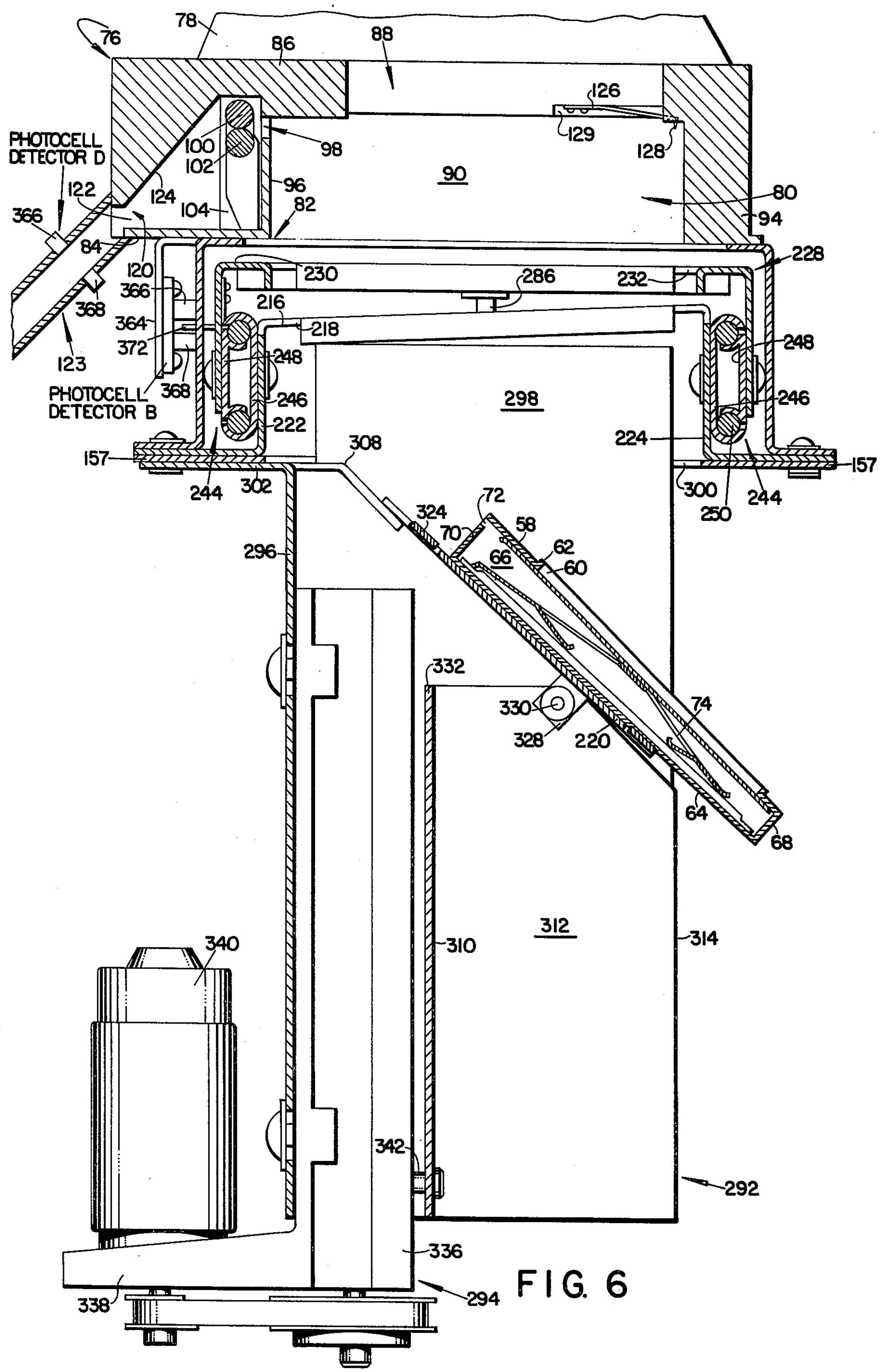
FIG. 6 is a left side sectional view of the cassette changing apparatus of FIG. 2 showing the elevator in its second position with the elevator platform tilted for disposing of an empty cassette.

In a preferred embodiment, camera 38 is configured to expose and process "integral type" self-developing film units 48 which are supplied in film cassettes 50 (see FIGS. 5 and 6).

An integral type, self-developing film unit 48 does not require the separation of individual positive and negative sheets subsequent to processing. Basically, it is a multi-layer structure bound at its edges and including an opaque bottom outer support sheet or layer; a transparent top outer support sheet or layer; and a plurality of superimposed layers of photographic materials, including one or more photosensitive layers and one or more image-receiving layers sandwiched between the two outer support sheets. Referring to FIG. 5, it can be seen that at one end of the film unit 48 is a rupturable container or pod 52 holding a supply of fluid processing composition.

The photosensitive material is adapted to be exposed by actinic light transmitted through the top transparent outer sheet. After exposure, a compressive pressure is applied progressively along the length of the film unit 48 to discharge the fluid from pod 52 and distribute it between a predetermined pair of adjacent layers to initiate the development and diffusion transfer process. In FIG. 5 the film unit 48 is diagrammatically illustrated as having a top sheet-like element 54 and a bottom sheet-like element 56 between which the fluid is distributed, but in reality elements 54 and 56 are multilayer structures.

The processing fluid preferably includes a light opacification system which prevents light from penetrating through the distributed layer of fluid and causing further exposure of the photosensitive materials. This allows film unit 48 to be ejected from the camera into ambient illumination while the development and diffusion transfer process is in progress. Once this process is complete, the positive image is viewable through the top transparent outer sheet 54.

For a detailed description of a representative example of such an "integral type," self-developing film unit 48, reference may be had to U.S. Pat. No. 3,415,644 issued to Edwin H. Land on Dec. 10, 1968.

The cassette 50, as shown in FIGS. 4, 5, 6, 8 and 9 is a box-like structure, preferably of molded plastic construction. It includes a generally planar forward wall 58 having a square or rectangular exposure aperture 60 therein through which actinic light is transmitted to expose the forwardmost film unit 48 in the stack. The exposure aperture 60 is bounded about most of its periphery by an integrally molded upstanding rib 62.

Spaced from forward wall 58 is an opposed generally planar rear wall 64. Intermediate forward wall 58 and rear wall 64 is a peripheral section of the cassette 50 defined by side walls 66, a trailing end wall 68 and a leading end wall 70 having a film withdrawal slot 72 therein adjacent the leading edge of forward wall 58.

In a preferred embodiment, there are 10 self-developing film units 48 arranged in stacked relation within cassette 50. The film units 48 are arranged therein with their top outer transparent sheets 54 facing aperture 60 and their pods 52 adjacent leading end wall 70. The stack is spring biased upwardly towards the interior surface of forward wall 58 by a spring platen 74 such that the forwardmost film unit bears against the interior surface and is aligned with withdrawal slot 72.

Subsequent to exposure, a forwardmost photoexposed film unit 48 is adapted to be engaged by a film advancing device in the camera 38 for movement through slot 72 and into engagement with a pair of pressure-applying members. Access for the film advancing device to engage the trailing end of the forwardmost film unit is provided by a slot 75 (shown in phantom lines in FIG. 4) which extends through a portion of rib 62 on forward wall 58, rearwardly along forward wall 58 to trailing end wall 68 and partway down wall 68.

Included in cassette 50, but not shown in the drawings, is a dark slide for initially protecting the stacked film units 48 from premature exposure through exposure aperture 60 and slot 75 until the cassette is located at its operative position in camera 38. Thereafter, the dark slide is ejected through withdrawal slot 72 in the same manner as a film unit 48.

It will be noted that the leading end of cassette 50 is a little thicker than its trailing end to accommodate the relatively thick pods 52 at the leading ends of the film units 48. In a preferred embodiment, the rear wall 64 of cassette 50 slopes away from the forward wall 58, in a direction from the trailing end to the leading end, at an angle of approximately 2° and the side walls 66 are tapered in a conforming manner.

The film units 48 are of the type that require an image reversal by the optical system to produce a correctly oriented positive image in the final print. In the illustrated optical system, this image reversal is provided by mirror 42. It will be understood, however, that other optical systems may be used which include an odd number of mirrors between the subject and the film plane. For example, see U.S. Pat. Nos. 3,821,760 and 3,852,783 which disclose an optical system including three mirrors in the exposure optical path and U.S. Pat. No. 3,820,136 that discloses a camera having a mirror between the objective lens and the film plane.

Figure 2:
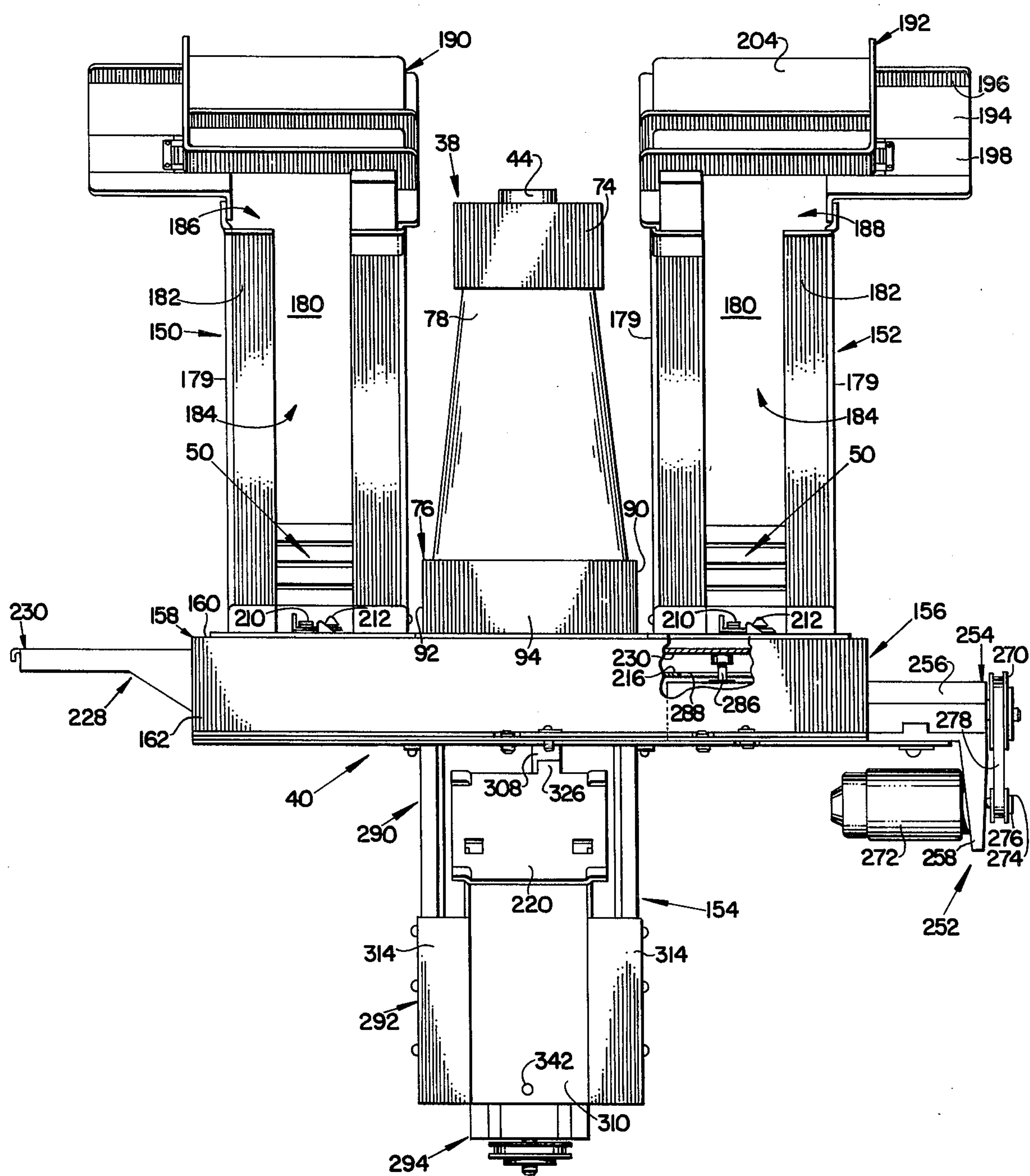
FIG. 2 is a front elevational view of the cassette changing apparatus, partly broken away, showing a cassette elevator in its second position with its cassette supporting platform tilted for cassette disposal.

As best shown in FIG. 2, camera 38 comprises a forward housing section 74, mounting objective lens 44 and an electrically operated shutter and aperture control assembly; a camera back 76 including means for receiving and operatively locating a cassette 50 within camera 38 and means for handling and processing a film unit 48 subsequent to exposure; and a light excluding hollow cone or light shield 78 extending between housing section 74 and camera back 76 for light shielding the optical path between objective lens 44 and the exposure plane.

Figure 4:
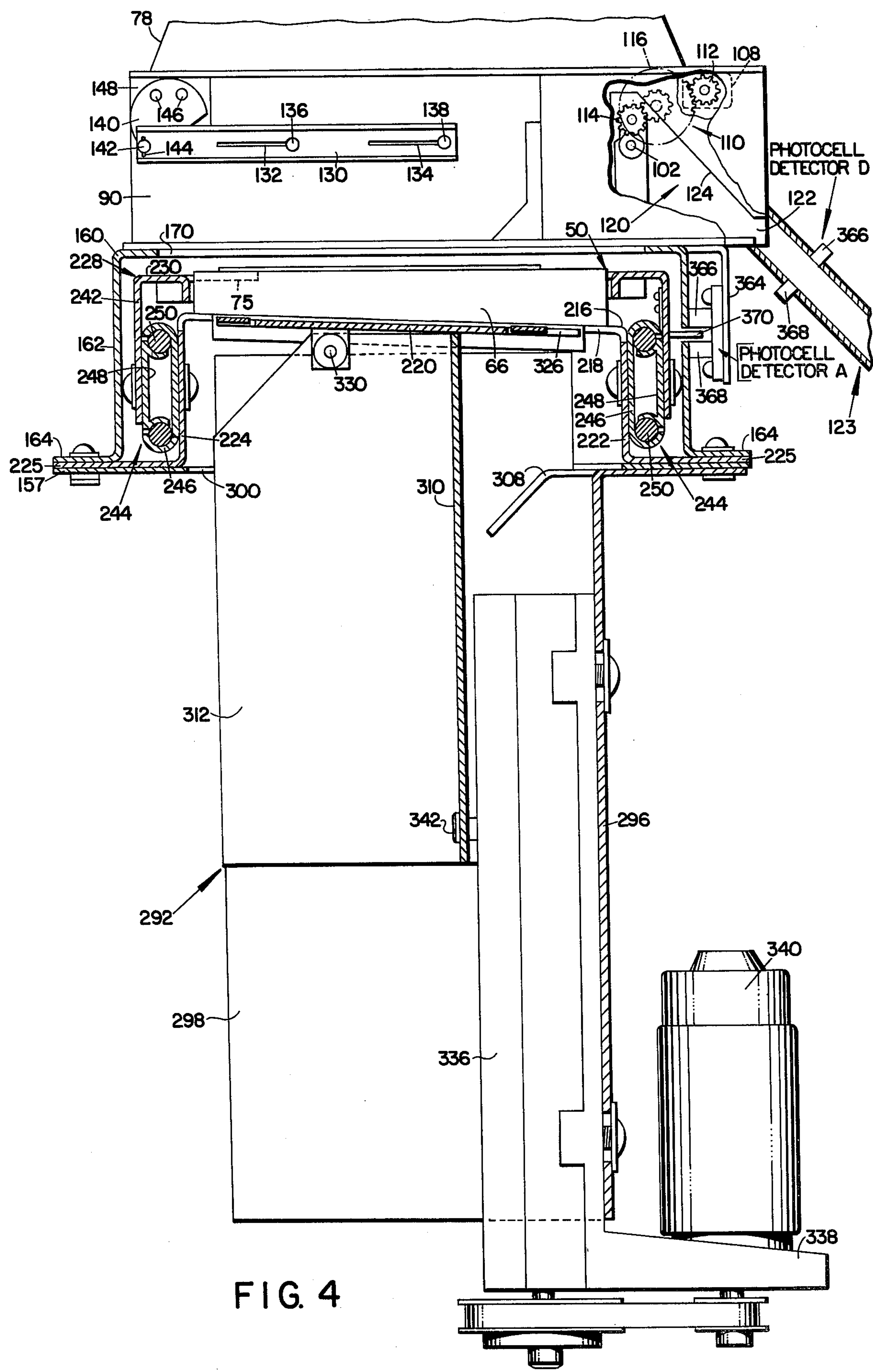
FIG. 4 is a right side sectional view of the cassette changing apparatus of FIG. 2 showing the elevator in its third or cassette receiving position.

As best shown in FIGS. 4, 5, and 6, the camera back 76 is generally parallelopiped in shape and includes an interior hollow cassette receiving and locating chamber or receptacle 80 which is accessible through a bottom access opening 82 in a substantially planar horizontal bottom wall 84 of camera back 76.

Receptacle 80 is defined by the interior surfaces of a horizontal top wall 86 having an aperture 88 therein communicating with the interior of light shield 78, a pair of vertical side walls 90 and 92, a vertical trailing end wall 94, and a vertical leading end wall 96 having a horizontal slot 98 therein adjacent top wall 86.

The cassette 50 is adapted to be inserted into receptacle 80 through bottom opening 82 with its top wall 58 having exposure aperture 60 therein facing the interior surface of the top wall 86. Opening 82 is dimensioned to closely conform to the periphery of cassette 50 and the interior surfaces of vertical walls 90, 92, 94 and 96 serve as guide means for guiding the cassette 60 as it moves upwardly in receptacle 80 towards the interior surface of top wall 86. As best shown in FIG. 5, the forward wall 58 of cassette 60 is adapted to bear against the interior horizontal surface of receptacle top wall 86 with its upstanding rib 62 around exposure aperture 60 extending into aperture 88 in telescoping fashion and engaging the vertical side walls defining the periphery of aperture 88. The film withdrawal slot 72 in leading end wall 70 of cassette 50 is aligned with the horizontal slot 98 in the leading end receptacle wall 96. When cassette 50 is so operatively located within receptacle 80, the forwardmost film unit 48 in the stack (subsequent to the removal of the dark slide) is located in position for exposure at the camera's exposure plane. It will be noted that the interior surface of the receptacle top wall 86 provides the vertical location of the cassette 50 with respect to the exposure plane while the vertical side walls defining the periphery of the receptacle opening 88 provide the lateral or horizontal location with respect to the exposure plane.

As best shown in FIGS. 4, 5, and 6, a pair of juxtaposed pressure applying rollers 100 and 102 are rotatably mounted on a suitable bracket 104 fixed to the bottom wall 84 of the camera back 76 just forwardly of the leading end receptacle wall 96 with the bite line of the rollers aligned with slot 98 in wall 96 and the film withdrawal slot 72 of a cassette 50 located in its operative position in receptacle 80.

In a preferred embodiment, the upper roller 100 is adapted to be rotatably driven for advancing an exposed film unit 48 between rollers 100 and 102. The roller drive means include a small D.C. electrical motor 108 mounted within camera back 76 near its leading end and forwardly of the rollers 100 and 102, and a speed reduction gear train 110 for transmitting power from motor 108 to roller 100. Gear train 110 includes a pinion gear 112 coupled to the output shaft of motor 108; a pinion gear 114 coupled to the end of roller 100, and a compound gear 116 having its large diameter section in mesh with gear 112 and its smaller diameter section in mesh with gear 114.

Extending forwardly of rollers 100 and 102 is a downwardly inclined passageway 120 leading to a film exit slot 122 at the lower leading end of camera back 76 which communicates with a film delivery chute that extends through wall 22 to the studio compartment 24.

Subsequent to exposure, the forwardmost film unit 48 is adapted to be advanced through slots 72 and 98 and into the bite of rollers 100 and 102. Roller 100 is driven in a direction to cause the film unit 48 to pass between the rollers 100 and 102 which progressively apply a compressive pressure along the length of the advancing film unit to discharge the fluid from pod 52 and distribute it between the predetermined pair of layers within the film unit.

As the film unit 48 emerges from the exit side of the rollers, it engages a downwardly sloped surface 124, defining part of passageway 120, and is deflected downwardly towards exit slot 122 thereby temporarily inducing a large radius bend in the film unit. It has been found that this procedure significantly contributes to improving the uniformity of the fluid distribution within the film unit. The film unit 48 exits through slot 122 into delivery chute 123 for delivery to the user.

As best shown in FIGS. 5 and 6, the means for advancing the forwardmost film unit 48 through slot 72 includes an elongated resilient pick 126 having a hooked end 128 that is adapted to extend through the slot 75 in the cassette 50 and engage the trailing end of the forwardmost film unit. The forward portion of pick 126 extends through a slot 129 in side wall 90 of camera back 76 and is fixedly attached to a slide member 130 that is best shown in FIG. 4. Slide member 130 includes slots 132 and 134 therein through which guide pins 136 and 138, respectively, that are fixedly attached to wall 90, extend to guide the movement of slide member 130.

Slide member 130 is adapted to be driven forwardly (to the right as viewed in FIG. 4) by a bell crank 140 which has an outwardly projective drive pin 142 extending through an elongated slot 144 near the trailing end of slide member 130. In a preferred embodiment, bell crank 140 is attached, such as by screws 146, to the output plate of a rotary solenoid 148 mounted in a notch formed at the intersection of walls 90 and 94. Upon energization of the solenoid, the output plate rotates in a counterclockwise direction (as viewed in FIG. 4) about its axis through a limited arc of approximately 45° thereby rotating bell crank 140 in a counterclockwise direction to drive slide member 130 forwardly via pin 142. Upon deenergization of solenoid 148, the output plate rotates back to its normal position thereby moving bell crank 140 and slide member 130 back to the position shown in FIG. 4.

During an automatic picture taking cycle, the photostudio is actuated by the user and the camera shutter and strobe lights operate in timed relationship as will become apparent later. Image bearing light reflected from the subject passes through the glass plate or half-silvered mirror 36 and impinges on mirror 42 which reflects it downwardly through lens 44 to expose a forwardmost film unit 48 in the cassette 50 operatively positioned in receptacle 80. The motor 108 is energized causing the top roller 100 to rotate and the solenoid 148 is energized to move pick 126 forwardly and cause the advancement of the film unit into the bite of the rollers 100 and 102. The rollers 100 and 102 apply pressure to the film unit and advance it through passageway 120 and into delivery chute 123.

After the 10 film units in the cassette 50 have been expended, the cassette changing apparatus 40 is actuated to proceed through an automatic cassette changing cycle during which the empty cassette 50 in receptacle 80 is removed and a full cassette 50 is placed therein.

Generally speaking, and as shown in FIG. 2, the cassette changing apparatus 40 comprises first and second vertically disposed, gravity feed cassette holding magazines 150 and 152 located on opposite sides of camera 38; a cassette carrier or elevator 154 for moving cassettes 50 into and out of camera receptacle 80, and a shuttle mechanism 156 for dispensing the cassettes 50 from the magazines 150 and 152 and moving them along a guide plate to the elevator 154.

In a preferred embodiment, apparatus 40 includes a horizontally disposed generally rectangular base plate or member 157 for supporting components of the changing apparatus. Plate 157 may be attached to the apparatus compartment of the photostudio housing wall 22 by suitable brackets (not shown).

Mounted on plate 157 is an elongated support member 158 for supporting magazines 150 and 152 and camera 38. As shown in FIGS. 1 through 6, 8 and 9, support member 158 is preferably a sheet metal structure including a top horizontal wall or support plate 160 and a pair of vertically depending side walls 162 which have outwardly turned horizontal bottom flanges 164 for securing support member 158 to base plate 157 such as by fasteners 168.

Figure 8:
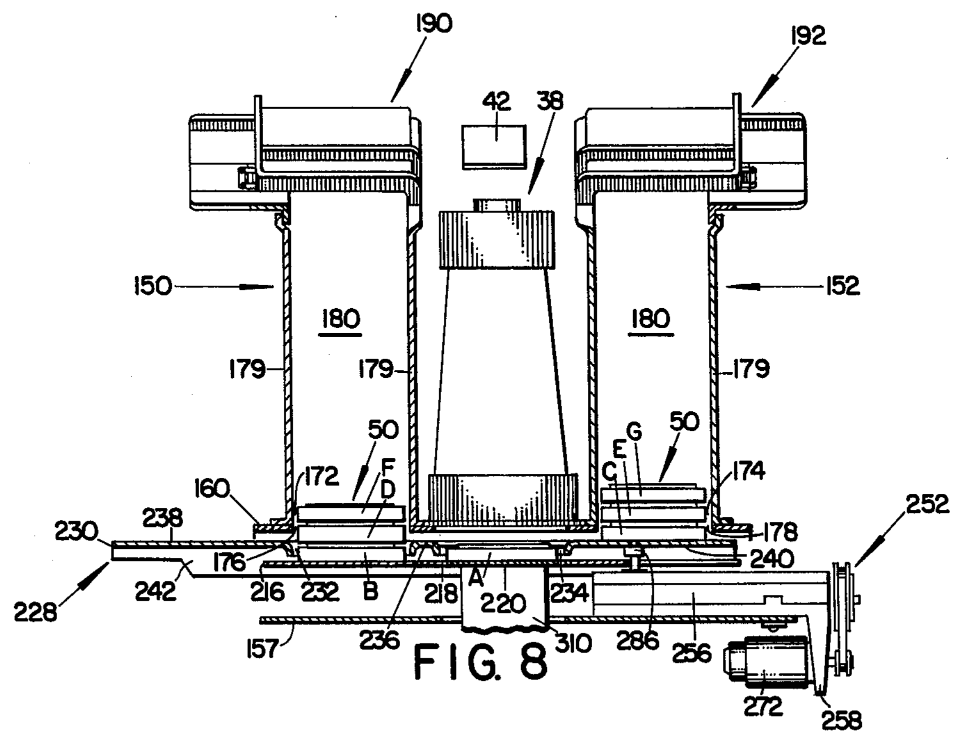
FIG. 8 is an elevational view, partly in section, of the cassette changing mechanism embodying the present invention showing the shuttle plate in a first of two terminal positions.
Figure 9:
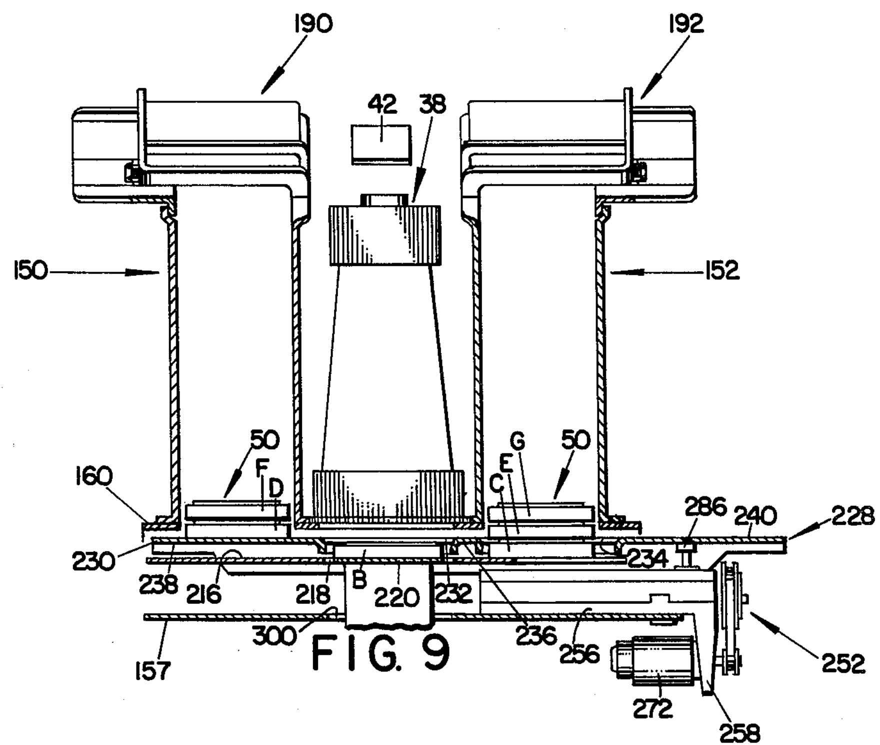
FIG. 9 is an elevational view, partly in section, showing the shuttle plate in a second of two terminal positions.

The camera 38 is centrally mounted on support plate 160 with the bottom surface 84 of camera back 76 resting thereon and the bottom opening 82 of receptacle 80 in alignment with a coextensive central opening 170 therein as best shown in FIGS. 8 and 9. The magazines 150 and 152 are secured to support member 160, in opposite sides of camera back 76, with their respective bottom openings 172 and 174 in alignment with coextensive openings 176 and 178 in 160 on opposite sides of central opening 170.

Figures 3, 11:
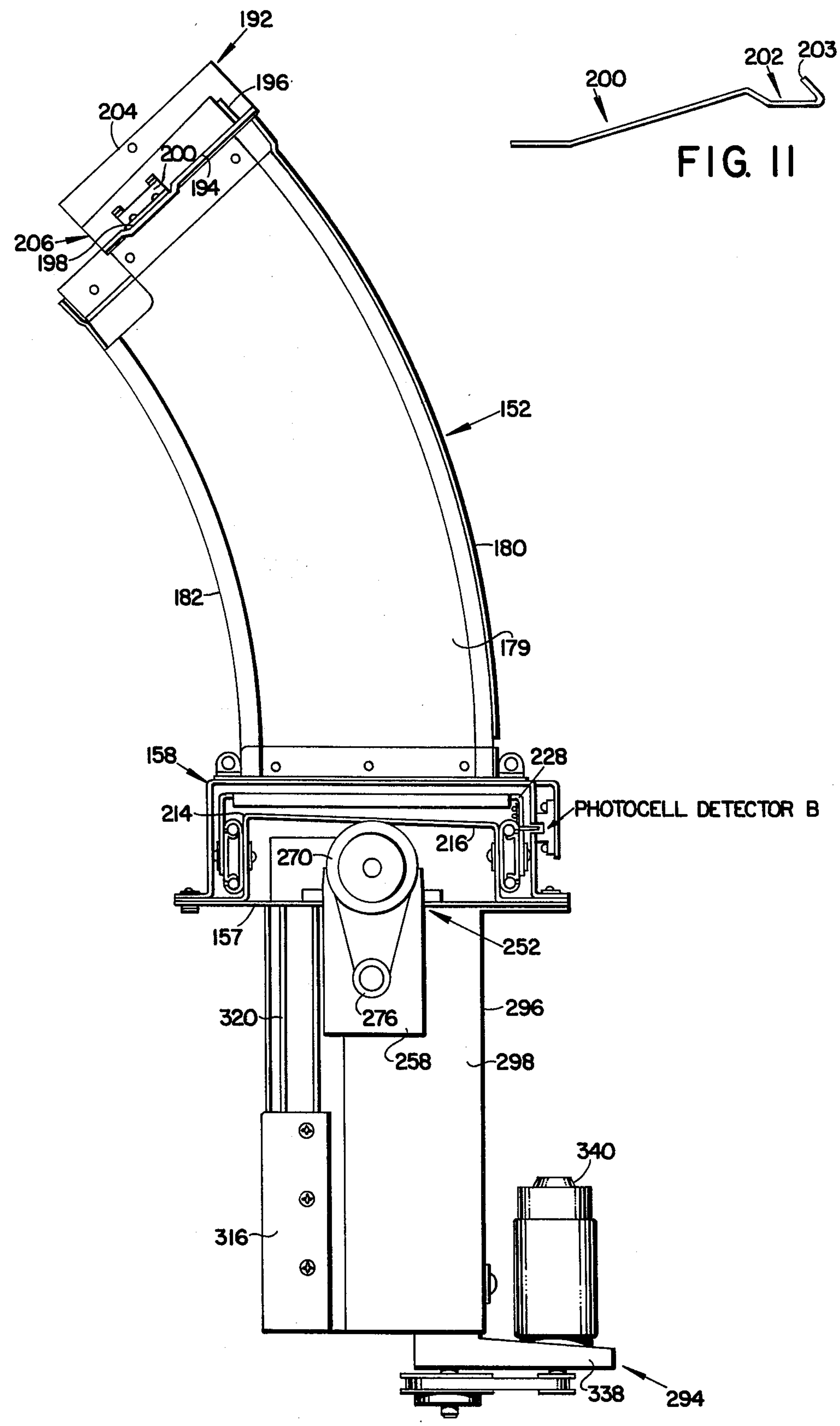
FIG. 3 is a right side elevational view of the cassette changing apparatus shown in FIG. 2.
FIG. 11 is a side elevational view of a cassette arresting spring provided in a magazine loading guide to prevent insertion of a cassette that is not correctly orientated.

The magazines 150 and 152 are preferably hollow, gently curving duct-like structures having top and bottom end openings and a rectangular cross section conforming to the peripheral shape of the cassettes 50. Each magazine 150 and 152 is defined by a pair of side walls 179, a rear wall 180, and a forward wall 182 having a centrally disposed longitudinal slot 184 thereon running from the top to the bottom of the magazine to facilitate loading. As best shown in FIG. 3, the magazines 150 and 152 extend upwardly from the support plate 160 of support member 158 in a substantially vertical direction and define a gentle curve or large radius arc to accommodate a stack of film cassettes 50 which assumes a large radius arc configuration because, as previously noted, the cassettes have a blunted wedge shaped profile and are thicker at their leading end than at their trailing ends to accommodate the fluid carrying pods 52.

The cassettes 50 are adapted to be loaded into the magazines 150 and 152 through their respective top openings designated 186 and 188. To insure that the service personnel load the cassettes into the magazines in the correct orientation (cassette forward wall 58 having exposure apertures 60 thereon facing upwardly and leading end wall 70 having film withdrawal slot 72 therein facing the rear wall 180 of the magazine) the magazines 150 and 152 are provided with cassette loading guides 190 and 192 attached to the tops of the magazines in partial blocking relation to the top openings 186 and 188.

The right-hand guide 192 (as viewed in FIG. 2) will be described with a side view thereof being provided in FIG. 3. It will be understood that guide 190 is identical to guide 192 except that its component parts are arranged in a left-hand orientation.

Guide 192 includes a bottom plate-like member 194 attached to the top end of the right-hand side wall 179 of magazine 152 and extending outwardly therefrom in a plane that is normal to side wall 179. Member 194 includes a laterally extending upturned flange 196 at its upper end and a laterally extending recess or channel 198 adjacent its bottom end. Mounted in channel 198 is a leaf spring pack arrester 200 having one end secured in the channel 198 and its opposite free end, formed with an integral channel or depression 202 therein and an end hook 203, extending upwardly beyond the top surface of member 194 (see FIG. 11).

Guide 192 also includes a cap member 204 which is secured to the top edges of left side wall 179 and the rear wall 180 and extends over the top opening 188 and slightly beyond the right side wall 179 in spaced relation to member 194.

As best shown in FIG. 3, plate-like member 194 and cap 204 cooperate to define a tapered or blunted wedge shaped access opening 206 therebetween which conforms to the profile of cassette 50.

In operation, a cassette 50 that is to be loaded into magazine 152 is placed on guide member 194 with the planar bottom wall 64 of the cassette 50 resting on the surface of member 194 and the leading end wall 70 in abutment with the upturned flange 196. The cassette 50 is then moved to the left (as viewed in FIG. 2) through the access opening 206 to a position over and in alignment with the magazine top opening 188 from where it may be lowered into magazine 152. As the cassette 50 is moved laterally through access opening 206, the planar bottom wall of the cassette engages and depresses the free end of spring 200 into channel 198 allowing the cassette to pass over spring 200.

If however, the cassette 50 is not correctly oriented initially on guide member 194 it will not be able to slide through access opening 206. Assume, for example, that the cassette is placed on guide member 194 with its leading end wall 70 in engagement with flange 196 but with the forward wall 58 having exposure aperture 60 therein facing downwardly. As the cassette 50 is initially advanced through access opening 206, the forward wall 58 depresses the free end of spring 200. However, as the upstanding rib 62 around the exposure aperture 60 passes over the channel 202, the free end moves up slightly and the end hook 203 engages the rib 62 thereby preventing further movement of the cassette 50 through the access opening 206. On the other hand, if the cassette 50 is incorrectly placed on the guide member 194 with its trailing end wall abutting flange 196, the cassette 50 will not slide through access opening 206 because the thicker leading end of the cassette will not pass through the narrow end of tapered opening 206 remote from flange 196.

Thus, cassettes 50 are adapted to be stacked in magazines 150 and 152 in a predetermined correct orientation relative to the magazines 150 and 152 and cassette guide means 190 and 192 serve as means for preventing a cassette oriented in a configuration other than the predetermined orientation from being inserted into the magazines 150 and 152.

As best shown in FIG. 2, the magazines 150 and 152 are preferably releasably attached to the support member 158 by means of clip latches 210 secured to the base of the magazines which are adapted to engage upstanding pins 212 provided on the top wall 160 of support member 158.

As noted earlier, the cassettes 50 are adapted to be dispensed alternately from the first and second magazines 150 and 152 and moved laterally to the cassette elevator 154 for subsequent movement into camera receptacle 80.

In a preferred embodiment, the cassettes 50 are alternately dispensed from the magazines 150 and 152 onto a cassette guide member 214 and are slidingly moved along the guide member 214 to the elevator 154 by the reciprocating shuttle mechanism 156.

As shown in FIGS. 3, 4, 5, 6, 8 and 9, the guide member 214 is preferably an elongated unitary sheet metal structure mounted on base plate 157 within the confines of support member 158 and extending the length thereof below the bottom openings of the magazines 150 and 152 and the camera back bottom opening 82. Guide member 214 comprises a top wall or cassette guide plate 216 which is inclined at a 2° angle from the horizontal and includes a central rectangular opening 218 therein aligned with the central opening 170 in support plate 160 and the bottom opening 82 of camera back 76, and a pair of vertically depending side walls 222 and 224 which terminate in outwardly turned horizontal flanges 225 which are utilized to secure guide member 214 to base plate 154.

The upper surface of top wall or guide plate 216 serves as the guide means for guiding the movement of cassettes 50 from positions directly below the magazines 150 and 152 laterally to a platform 220 of elevator car of elevator 154 which is adapted to be located in blocking relation to opening 218 and just slightly below the upper surface of guide plate 216 when the elevator car is located in its cassette receiving position as will be described in detail hereinafter.

As best shown in FIG. 4, the later to be described elevator platform 220 also is inclined at 2° to the horizontal when located in its pack receiving position. The 2° inclination corresponds to the 2° taper of a cassette 50 so that when the inclined bottom wall 64 of cassette 50 rests on the upper surface of the inclined guide plate 216 or the inclined elevator platform 220 the forward wall 58 of cassette 50 is horizontal. Therefore the cassette 50 may be raised vertically, directly into the cassette receptacle 80, to bring the forward wall 58 of the cassette 50 into bearing relation with horizontally disposed interior surface of receptacle top wall 86.

The shuttle mechanism 156 or means for dispensing the cassette 50 alternately from magazines 150 and 152 onto guide plate 216 and for moving the dispensed cassettes 50 along guide plate 216 and onto the elevator platform 220 comprises a shuttle plate member 228 located between the support member 158 and guide member 214 and being coupled to the side walls 220 and 224 of guide member 214 for reciprocating movement between first and second terminal positions shown, respectively, in FIGS. 8 and 9.

As best shown in FIGS. 2 through 7, shuttle plate member 228 is preferably an elongated sheet metal structure including a top horizontal wall or shuttle plate 230 which is longer than support member 158 and has a pair of adjacent substantially rectangular openings 232 and 234 therein. The openings 232 and 234 are dimensioned to conform closely to the peripheral measurements of a cassette but are large enough to allow a cassette 50 to drop into these openings and rest on the guide plate 216 of guide member 214 when these openings are aligned with the bottom openings 172 and 174 of the magazines 150 and 152. The openings 232 and 234 are separated by a central portion 236 of guide plate 230 and end portions 238 and 240 of guide plate 230 are disposed outboard of openings 232 and 234 respectively.

The shuttle plate member 228 also includes a pair of vertical side walls 242 which depend from the lateral edges of shuttle plate 230. As best shown in FIG. 6, shuttle plate member 228 is coupled to guide member 214 for reciprocating movement by means of a pair of ball bearing slide assemblies 244 having elongated track or channel portions 246 thereof fixedly secured to side walls 222 and 224 of guide member 214 and slider portions 248, which run on ball bearings 250 captured in the channel portion 246, fixedly secured to side walls 242 of shuttle plate member 228.

Means, in the form of a linear actuator assembly 252, are provided for driving or moving the shuttle plate member 228 between its first and second terminal positions. As best shown in FIGS. 2, 3, 7, 8 and 9, assembly 252 includes an actuator body or frame 254 comprising a hollow horizontal portion 256 secured to the end of base plate 157 beneath magazine 152 and a vertically depending end portion 258 which is located beyond the edge of base plate 157 and extends downwardly therebelow.

Figure 7:
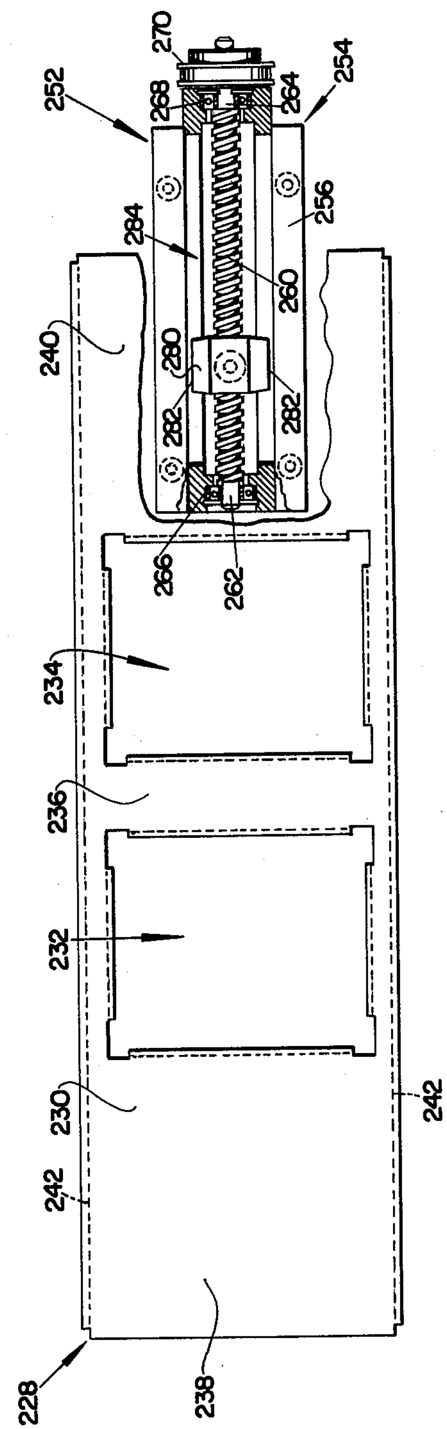
FIG. 7 is a top elevational view, partly in section and partly broken away, of a reciprocating shuttle plate member and a linear actuator for moving the shuttle plate member between first and second terminal positions.

As best shown in FIG. 7, a horizontally disposed acme thread lead screw 260 is rotatably mounted within body portion 256 having its unthreaded ends or journals 262 and 264 rotatably supported in bearings 266 and 268 located within body portion 256 at opposite ends thereof. The end 264 of screw 260 extends outwardly beyond the end of body portion 256 and has a pulley 270 fixedly secured thereto.

The lead screw 260 is adapted to be rotatably and reversibly driven by a small, reversible electric motor 272 mounted on body portion 256 under base plate 157. The output shaft 274 of motor 272 extends through body portion 258 and has a pulley 276 fixedly secured thereto which is coupled to pulley 270 by a friction belt 278 thereby establishing the rotatory drive coupling between motor 272 and lead screw 260.

The lead screw 260 is adapted to drive a relatively large nut 280 threaded thereon and having its planar side walls 282 captured in a linear and longitudinally extending channel 284 within body portion 256. Because the walls of channel 284 prevent nut 280 from rotating with screw 260, nut 280 moves linearly within the channel 282 in response to rotating screw 260 with the direction of movement of nut 280 being reversible in response to reversing the direction of rotation of screw 260.

The nut 280 is accessable through a longitudinal slot in the top of body portion 256 and is coupled to shuttle plate member 228 by means of a pin 286 having the bottom end thereof secured to nut 280 and the top end thereof fixedly secured to the shuttle plate 230. It will be noted that the guide plate 216 of guide member 214 has an elongated, longitudinally extending slot 288 therein below magazine 152 which provides clearance for pin 286 when the shuttle plate member 228 is driven between its first and second position.

In operation, the shuttle plate 230 effects the dispensing by gravity of the cassettes 50 alternately from magazines 150 and 152 by selectively blocking and unblocking the bottom openings 172 and 174 of the magazines 150 and 152.

FIG. 8 shows the shuttle plate member 228 in its first terminal position or all the way to the left. The right end portion 240 of shuttle plate 230 is located in blocking relation to the bottom opening 174 of magazine 152 preventing the lowermost cassette C from dropping down onto guide plate 216. Shuttle plate opening 234 is aligned with opening 218 in guide plate 218, the elevator platform 220 located in its cassette receiving position and the bottom opening 82 of receptacle 80 with the edges differing opening 234 surrounding the periphery of a previously dispensed cassette A located on elevator platform 220. Opening 232 in shuttle plate 230 is aligned with the bottom opening 172 of magazine 150 thereby unblocking opening 172 and allowing the lowermost cassette B in the stack to drop onto guide plate 216. The left end 238 of shuttle plate member 228 extends outwardly to the left beyond magazine 150.

As will be explained later, the elevator car of elevator 154 moves cassette A up into receptacle 80. After the film units in cassette A have been expended, the elevator is driven downwardly carrying the empty cassette A on its platform 220 to a position below base plate 157 where the platform 220 tilts allowing the empty cassette A to slide off and fall into a disposal bin. The elevator car then moves upwardly again and stops such that the platform 220 is once again in its cassette receiving position slightly below the upper surface of guide plate 216 and in blocking relation to opening 218.

The shuttle plate drive motor 272 is energized and the linear actuator assembly 252 drives shuttle plate member 228 to the right to its second terminal position shown in FIG. 9.

As the shuttle plate 230 moves to the right, the edges of the plate 230 which define opening 232 engage cassette B and slide it along the guide plate 216 and onto the elevator platform 220. The left end portion 238 of shuttle plate 230 moves under magazine 150 and blocks bottom opening 172 to prevent the lowermost cassette D therein from dropping onto guide plate 216. The right-hand opening 234 moves to the aligned position under magazine 152 thereby unblocking the bottom opening 174 and allowing the lowermost cassette C therein to drop onto guide plate 216. The right-hand end portion 240 of plate 238 extends outwardly to the right beyond magazine 152. The elevator car then operates to move cassette B into the camera receptacle, and the sequence is repeated. During the next cassette changing cycle the shuttle plate member 228 will be moved from the second position back to the first position to move cassette C along guide plate 216 to elevator platform 220 and effect the dispensing of cassette D from magazine 150.

It will be noted that the shuttle plate member 228 moves from one terminal position to the other terminal position during the cassette changing cycle and that the direction of movement is reversed during each successive cycle by reversing the direction of rotational drive of motor 272. Therefore, during each movement of shuttle plate member 228 between its first and second positions, a cassette 50 is dispensed from one of the two magazines 150 and 152 and a cassette dispensed from the other magazine during the preceding cycle is moved along the guide plate 216 to the elevator platform 220 located in its cassette receiving position.

As shown in FIG. 2, the cassette carrier or elevator 154 comprises: an elevator support member 290 fixedly secured to base plate 157; an elevator car 292 mounting elevator platform 220 and being coupled to elevator support member 290 for vertical movement relative thereto between a first or uppermost position closest to receptacle 80 wherein platform 220 extends up into camera receptacle 80 and holds a cassette 50 thereon in its previously described operative position shown in FIG. 5, a second or lowermost position remote from the first position and furthest from receptacle 80 wherein platform 220 is below plate 157 and is tilted for cassette disposal as shown in FIGS. 2 and 6, and a third or cassette receiving position intermediate the first and second positions wherein the platform 220 is just slightly below the top surface of guide plate 216 in blocking relation to the central opening 218 therein; and a reversible linear actuator assembly 294 for driving or moving car 292 between its first, second and third positions.

Figure 10:
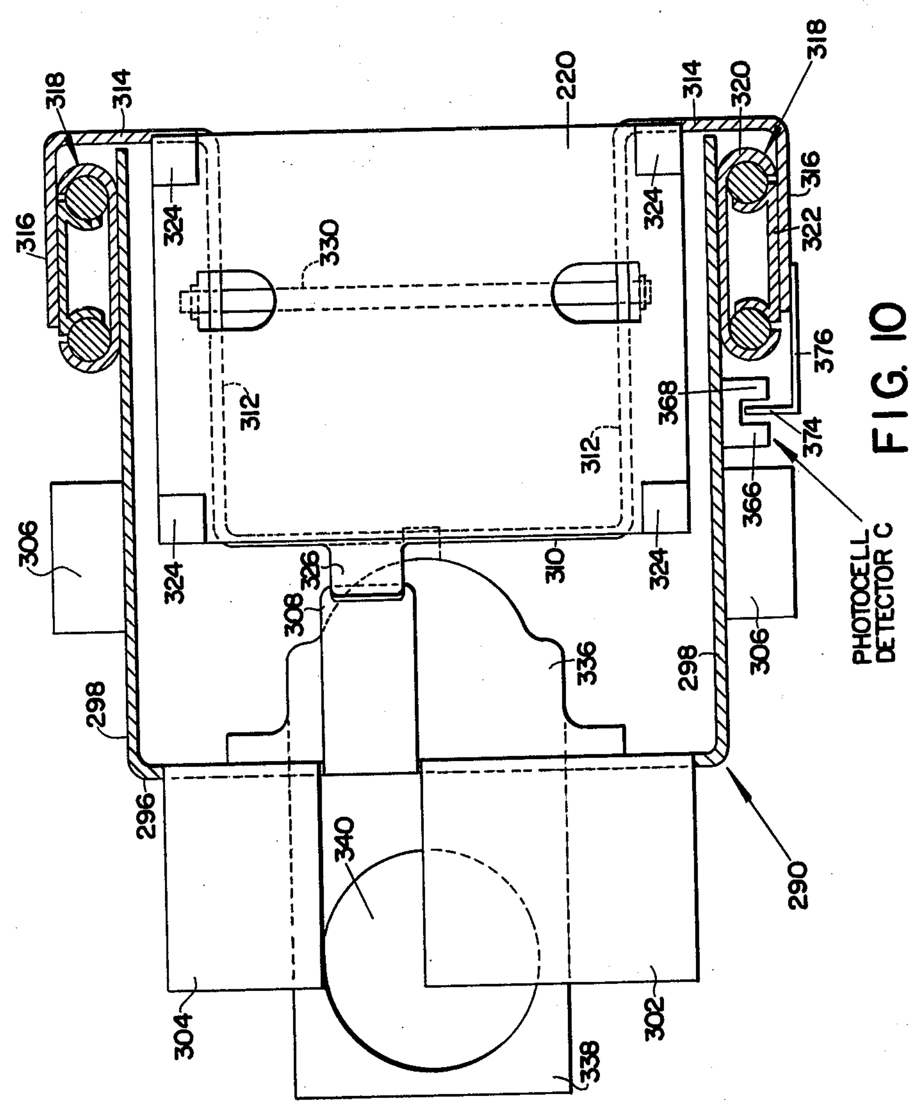
FIG. 10 is a top cross sectional view of cassette elevator mounting arrangement.

As best shown in FIG. 10, elevator support member 290 is preferably a unitary, sheet metal, U shaped structure defined by a vertical back wall 296 and a pair of forwardly extending side walls 298. Elevator support 290 is aligned with a central rectangular opening 300 in base plate 157 and is attached to base plate 157 by means of outwardly turned horizontal tabs 302 and 304 at the top edge of rear wall 296 and a pair of outwardly turned horizontal tabs 306 punched out of side walls 298. It will be noted that an inwardly turned tab 308 is provided at the top edge of back wall 296 intermediate tabs 302 and 304. As will be described later, tab 308 serves to tilt the elevator platform 220 as the elevator car 292 approaches its lowermost second position. As best shown in FIGS. 4, 5 and 6, the side walls 298 of support member 290 extend upwardly through the central opening 300 in base plate 157 and terminate just below guide plate 216.

The elevator car 292 is preferably also a sheet metal structure defined by a plurality of vertical walls including a rear wall 310, a pair of forwardly extending interior side walls 312, a pair of outwardly turned end walls 314 and a pair of rearwardly extending short exterior side walls 316.

As best shown in FIGS. 2, 4, 5, 6 and 10, the back wall 310 and interior side walls 312 of car 290 form a U-shaped portion of car 290 that moves vertically within the interior of the U-shaped channel defined by elevator support back wall 296 and side walls 298. The end walls 314 of car 290 extend around the forward edges of the elevator support side walls 298 and locate the short exterior side walls 316 of car 292 in spaced parallel relation to the exterior surface of side walls 298. The car 290 is coupled to support 290 for vertical movement relative thereto by means of a pair of vertical ball bearing slider assemblies 318 having their track or channel portions 320 fixedly mounted on the exterior side of support side walls 298 and their cooperating slider portions 322 fixedly secured to the interior side of the car exterior side walls 316.

The elevator platform 220 is a generally rectangular plate-like structure, preferably formed of sheet metal, having slightly raised pads 324 at its four corners, a rearwardly extending tab 326 which is adapted to engage the platform tilt tab 308 on support member 290 and a pair of vertically depending tabs 328 which are used to pivotally couple platform 220 to car 290 by means of a horizontal shaft or axle 330 which extends through the tabs 328 and the interior side walls 312 of car 292.

As best shown in FIGS. 4 and 5, the elevator platform 220 is balanced with respect to pivot shaft 330 so that it normally rests on the top edge 332 of the elevator car back wall 310 with the elevator pads 324 located in a plane that is inclined 2 degrees from the horizontal to accommodate the 2° taper of the cassette 50. That is, more of the platform weight is concentrated on the left side of shaft 330 than on the right side (as viewed in FIGS. 4 and 5) providing a counterclockwise moment about shaft 330 for normally maintaining the platform 220 in its cassette receiving in supporting position wherein it is substantially parallel to guide plate 216. As will be explained later, with reference to FIG. 6, the interior side walls 312 of car 290 are cut away at approximately a 45° angle to the right of pivot shaft 330 (as viewed in FIG. 6) to allow the elevator to tilt for cassette disposal.

The means for moving the elevator car 292 up and down elevator support member 290 includes the reversible linear actuator assembly 294 having its hollow body portion 336 mounted vertically on the interior side of the elevator support back wall 296 and its rearwardly extending portion 338, mounting a small reversible electric motor 340 positioned behind wall 296. The linear actuator assembly 294 is coupled to car 292 by means of a pin 342 having one end fixedly secured to the bottom of car back wall 310 and its opposite end secured to a drive nut mounted on the lead screw within actuator body portion 336. Linear actuator assembly 334 is essentially of the same construction as the linear actuator assembly 252 described earlier in connection with shuttle plate member 228 and does not need to be further described here.

Immediately preceding a cassette changing cycle the elevator car 292 is located in its first or uppermost position shown in FIG. 5 with the platform 220 in its normal slightly inclined position holding a cassette 50 thereon in the previously described operative position in camera receptacle 80.

It will be noted that the rear wall 64 of cassette 50 rests on the four slightly raised pads 324 at the corners of elevator platform 220 to concentrate the compressive force applied to the cassette along the vertical side walls 66 of the cassette rather than to the more flexible bottom wall 60 so that such a force will not distort the cassette or effect the fluid carrying pods 52.

In response to a logic signal indicating that the cassette 50 is empty, the motor 340 of linear actuator assembly 294 is energized and drives the lead screw therein in a direction to cause the nut thereon to move downwardly thereby moving car 292 downwardly by means of the connecting pin 342.

As car 292 moves downwardly, the platform 220 and the empty cassette 50 thereon descend through the aligned openings in support plate 160, shuttle plate 230, guide plate 216 and base plate 157. Upon arriving at base plate 157, the outwardly extending tab 326 on platform 220 engages the inwardly extending tab 308 on elevator support 290 causing the elevator platform 220 to pivot in a clockwise direction about pivot shaft 330 (as viewed in FIG. 6) in response to moving car 292 downwardly toward its second or lowermost position shown in FIG. 6. As car 292 approaches its second position, platform 220 tilts sufficiently for the empty cassette 50 thereon to slide off platform 50 and fall into a disposal bin (not shown) on the floor of apparatus compartment 26.

When car 292 reaches its lowermost second position, motor 340 is reversed to reverse the direction or rotation of the actuator lead screw thereby driving the car 292 upwardly. Because the elevator platform is counterbalanced as previously noted, the platform 220 automatically pivots counterclockwise about shaft 330 and returns to its normal position resting on edge 332 of car wall 310 when platform tab 326 clears the tilt tab 308. Car 292 continues upwardly until platform 220 assumes its cassette receiving position wherein it is just slightly below the upper surface of guide plate 216 and in blocking relation to opening 218 therein. The motor 340 is deenergized stopping car 292 in its third or intermediate position shown in FIG. 4.

The linear actuator motor 272 on actuator assembly 252 is energized causing the shuttle plate 230 to move from one of its terminal positions to the other terminal position thereby moving a cassette dispensed from one of the two magazines 150 and 152 during the preceding cassette changing cycle along guide plate 216 and onto elevator platform 220 and effecting the dispensing of a cassette 50 from the other magazine. The actuator motor 272 is then deenergized.

The motor 340 of actuator assembly 294 is energized once again and car 292 moves upwardly to its first position wherein platform 220 is located in receptacle 80 holding the cassette 50 thereon in its operative position in receptacle 80 as shown in FIG. 5 of the drawings. The motor 340 is then deenergized.

The process motor 108 and film pick solenoid 148 are then energized to operate pick 126 and drive roller 100 for advancing the dark slide from the cassette 50, through rollers 100 and 102, down through passage way 120 and exit slot 122 to the film delivery chute 123 for disposal.

Figure 12:
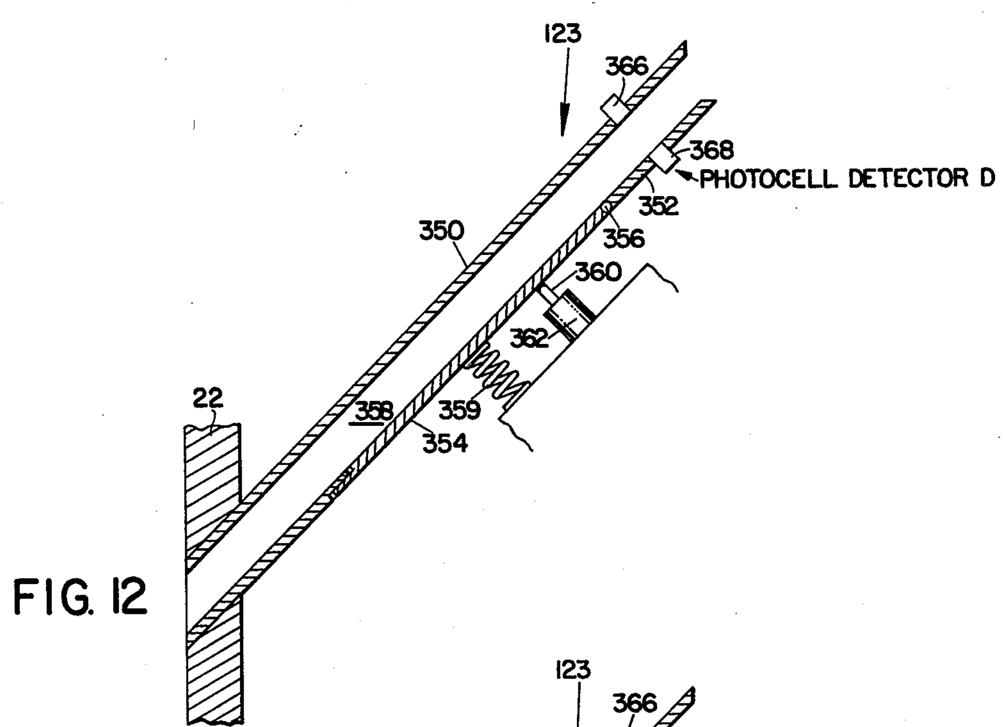
FIG. 12 is a side elevational view, partly in section, of a film delivery chute with a dark slide disposal door shown in its closest film delivery position.
Figure 13:
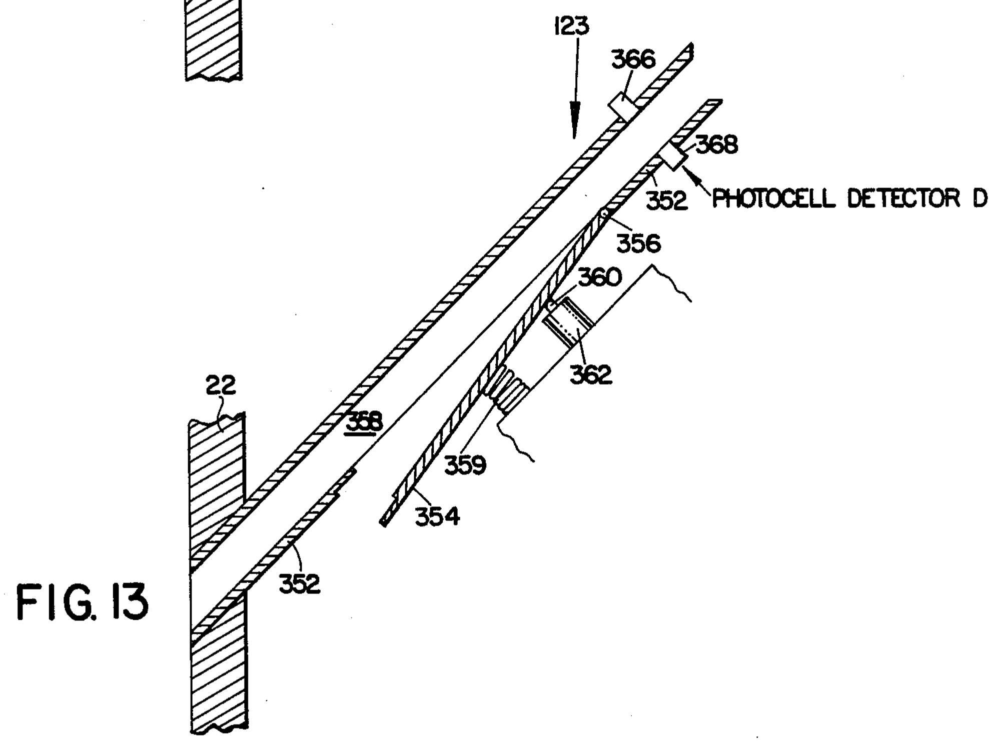
FIG. 13 is a side elevational view, partly in section, of the delivery chute of FIG. 12 showing the door in its open dark slide disposal position.

In a preferred embodiment, the dark slide is diverted from a normal film delivery path along chute 123 to the studio compartment 24. As best shown in FIGS. 12 and 13, chute 123 comprises a top wall 350, a bottom wall 352 having a door 354 pivotally coupled thereto at pin 356 and a pair of side walls 358 spacing walls 350 and 352 in parallel relation. Chute 123 is open at both ends and inclines downwardly from the film exit slot 122 on camera back 76 through an opening in compartment wall 122. The pivoting door 354 is held in its normally closed or film delivery position in alignment with bottom wall 352 by means of a compression spring 359 coupled at one end to door 354 and at the other end to a support structure within apparatus compartment 26. Also coupled to door 354 is a solenoid plunger 360 of a solenoid 362 mounted on the same support structure.

In a normal film delivery mode, solenoid 362 is not energized and door 354 is maintained in the delivery position by the bias of spring 359. During a dark slide eject mode, however, solenoid 362 is energized causing plunger 360 to retract thereby pivoting door 354 in a counterclockwise direction about pin 356 to an open position shown in FIG. 13. When the door 354 is open, it establishes a diverted path of travel for the dark slide whereby the dark slide drops out of chute 123 before it reaches the exit opening on the studio compartment side of wall 22. The door 354 automatically returns to the normal delivery path position when solenoid 362 is deenergized. Therefore chute 123 serves as means for guiding a film unit along a predetermined delivery path before it reaches the exit opening of chute 123 for disposal within the apparatus compartment. A disposal bin (not shown) is provided below door 354 for receiving the diverted dark slides.

As noted earlier the operation of the automatic photostudio is controlled by a logic system and certain event, function, and position detectors are inclined to provide logic signals during the course of both the picture taking and cassette changing cycles of operation.

For example, the logic system must know whether the shuttle plate member 228 is in the first or second terminal position so that its linear actuator motor 272 can be energized with the correct polarity to drive the shuttle plate member 228 to the opposite position. In a preferred embodiment, the cassette changing apparatus includes a pair of photocell interrupter detectors A and B for detecting respectively the first or left terminal position and the second or right terminal position of shuttle plate member 228. The left photocell detector A is shown in FIG. 4 while the right detector B is shown in FIGS. 5 and 6. The detectors A and B are fixedly mounted on sheet metal flanges 364 adjacent the path of travel of the rear side wall 242 of shuttle member 228.

Each of the detectors A and B includes a light source preferably a light emitting diode (LED) 366 and a photoelectric cell 368 spaced from LED 366 in position to receive and detect light emitted therefrom. The LED is normally energized and its detection by photocell 368 provides a logic signal of 0. When the beam of light is cut off from photocell the logic signal output switches to 1. The means for interrupting the light beam include a left interrupting tab 370 and a right interrupting tab 372 which are mounted respectively on the left and right ends of shuttle member rear side wall 242 and project outwardly therefrom so as to extend into the space between LED 366 and photocell 368 and interrupt the light beam when shuttle plate member 228 is in its first or second terminal position.

Another photocell interrupter detector, designated C, is provided on elevator 154 for the purpose of detecting when the elevator car 292 is in its said intermediate cassette receiving position. As best shown in FIG. 10, detector C, comprising an LED 366 and photocell 368, is fixedly mounted on the left elevator support side wall 298. The light beam from LED 366 is adapted to be interrupted or blocked by means of an interrupter tab 374 formed as part of a right angle flange 376 that is fixedly secured to the left side wall 316 of elevator car 292 so that tab 374 blocks the light beam when the elevator car 292 is in its third or cassette receiving position shown in FIG. 4. Again, detector C provides an 0 logic signal when light from LED 366 is detected by photocell 368 and a 1 logic signal when the light beam is interrupted by tab 374.

In a preferred embodiment, another photocell interrupter detector, designated D, is provided on delivery chute 123 to detect the passage therethrough of a film unit 48 or a dark slide. Detector D is shown in FIGS. 12 and 13. It comprises an LED 366 mounted in top wall 350 and an opposite photocell 368 mounted on bottom wall 352. The light beam emitted by the LED 366 and detected by photocell 368 is interrupted by the passage of a film unit 48 or dark slide therebetween causing a change in an output logic signal from 0 to 1.

Figure 14:
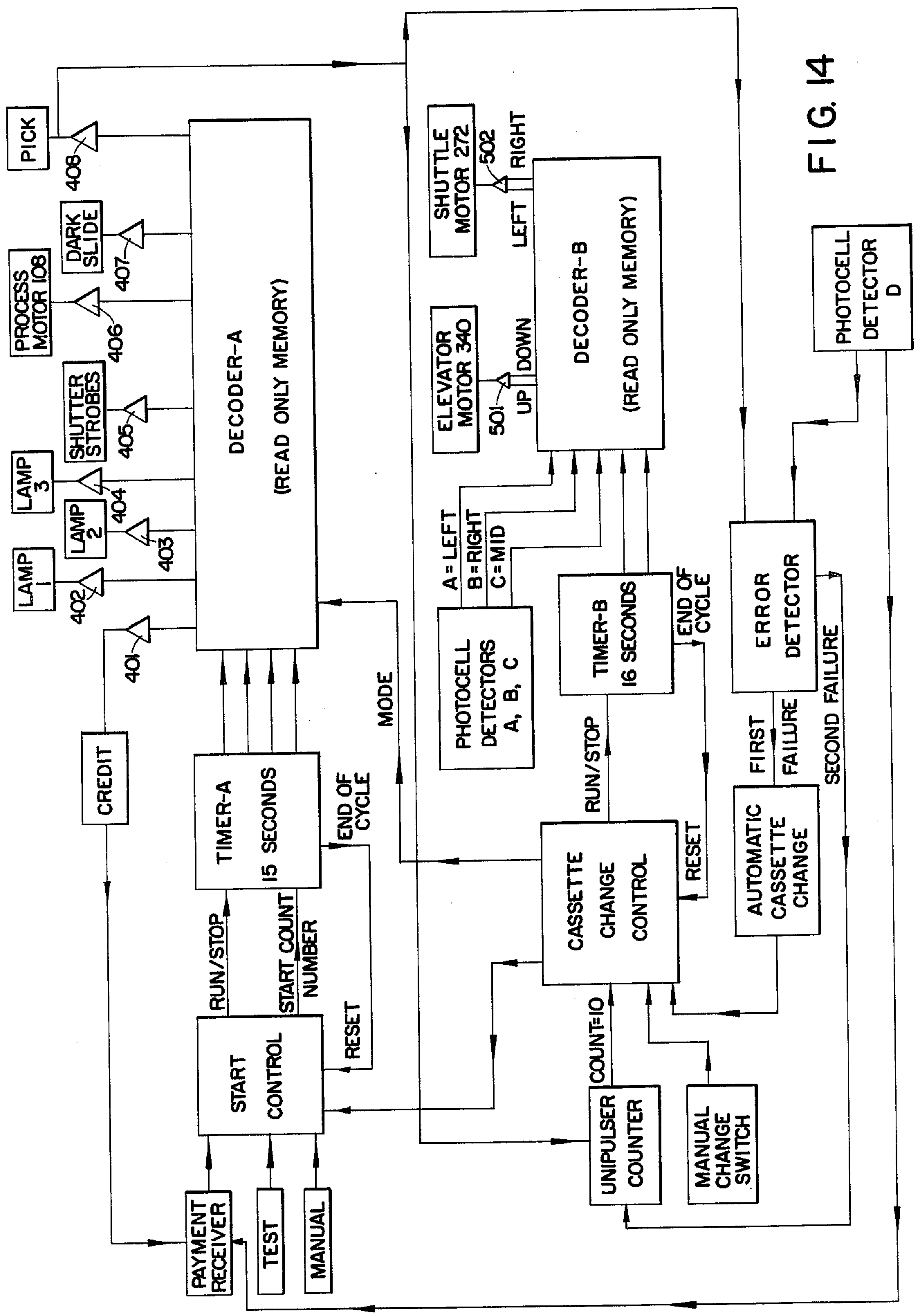
FIG. 14 is a block diagram of a logic system which is adapted to control the automatic operation of the photostudio embodying the present invention.

The logic system for controlling the operation of the automatic photostudio is shown in block diagram form in FIG. 14 of the drawings. It will be understood that the photostudio includes appropriate and well known power supplies and circuitry to accomplish the functions set forth even though such items are not shown in the diagram.

Referring now to FIG. 14, it will be assumed that a full cassette 50 is held in camera receptacle 80 by the elevator car 292 located in its first position and that the dark slide has been ejected.

To initiate a picture taking cycle, the user deposits a coin, bill or token into the payment receiver 46 which provides a logic output signal that serves as an input for a Start Control subsystem. The Start Control is a logic system which senses the input from the payment receiver 46 and provides a power latch run/stop output signal which serves as an input signal for a 15 second Timer — A. The Start Control also includes inhibiting circuitry which prevents the run/stop output if the system is in a cassette changing cycle or otherwise not ready to begin a picture taking cycle.

The Timer A serves as an 0 to 15 second counter. As will be described later, it is desirable to be able to start the counter at different starting count numbers to make use of selected portions of the 15 second interval. The Start Control therefore also has an output labeled start count number which serves as an input to Timer A.

In a normal picture taking cycle, the Start Control instructs the Timer A to start at 0 and count to 15 seconds. In another mode of picture taking operation to be described later, the Start Control is operable to instruct the Timer A to start the count at 6 seconds and proceed through to 15 seconds. Also, as will be described later, in conjunction with the cassette changing cycle, an input will be supplied to the Start Control causing it to instruct the Timer A to start the count at 9 seconds and proceed through to 15 seconds for the purpose of ejecting the dark slide from a cassette that has been introduced into the camera receptacle 80.

The output of Timer A is a four digit binary coded decimal number that serves as an input for a Decoder A which is a read only memory system. The Timer A is programmed to provide an output four digit number which changes sequentially every second to represent count numbers from 0 to 15 seconds. For example, for 0 the output is 0000. For 1 the output is 0001. For 2 the output is 0010. The output follows this sequence up to 15 seconds. When the count reaches 15 seconds, Timer A puts out an end of cycle logic signal which is fed back to the Start Control and serves as a reset. As will become apparent, the Decoder — A is programmed to operate in either a picture taking mode or a cassette changing mode. In addition to the four digit inputs from Timer — A, a mode input signal is provided to Decoder A by a Cassette Change Control to be described later. In the picture taking mode, the mode input signal is 0. For the cassette changing mode, the input signal is 1.

The Decoder — A is programmed to read the four digit binary input plus the mode input and respond by providing selected outputs for each of the possible combinations of the five input signals. In a preferred embodiment, Decoder — A has eight outputs which serve as logic input signal to cause the selective energization and deenergization of eight drive circuits (designated 401 through 408) for the functional blocks labeled CREDIT, LAMP I, LAMP II, LAMP III, SHUTTER AND STROBE, PROCESS MOTOR 108, DARK SLIDE and PICK.

In a preferred embodiment of the photostudio, the LAMPS I, II, and III are utilized to illuminate visual indicia or signs mounted on the studio compartment side of wall 22 to alert or instruct the user that his picture is about to be taken. The signs are adapted to be illuminated in sequence and may read "Pose," "Sit Back," "Smile;" to instruct the user as to how to prepare himself for having his picture taken — or alternately these signs may read "5 seconds," "3 seconds," "1 second" to indicate the time remaining until the activation of the shutter and strobes to initiate the film exposure phase.

In a typical picture taking cycle the mode input signal remains at 0. At the 0 second input from Timer A, the eight logic outputs of Decoder — A are at 0. At the one second input of 0001 the LAMP I output goes to 1 causing LAMP I to be energized by its drive circuit. The remaining seven outputs remain at 0. When the Timer input changes to 0010 the LAMP I output remains at 1 and the other 7 outputs remain at 0. At the 3 second input of 0011, LAMP I goes to 0, LAMP II goes to 1, and the other outputs remain at 0. At the 4 second input of 0100 LAMP II remains at 1, the other outputs remain at 0. At the 5 second input of 0101, LAMP II goes to 0 and LAMP III goes to 1, and the other outputs remain at 0. At the 6 second input, LAMP III goes to 0 and the Shutter and Strobe output goes to 1 to initiate exposure. Thus, by properly programming Decoder — A its outputs may be selectively provided on a time base defined by Timer A.

Assume now that the Timer count has started at 0000. At the 1 second input the LAMP I is energized illuminating the sign that says "Pose." At the 3 second input LAMP I goes off and LAMP II is energized illuminating the sign that says "Sit Back." At the 5 second input LAMP II goes off and LAMP III is energized to illuminate the "Smile" sign. At the 6 second input LAMP III goes off and the camera shutter and strobes are activated to effect exposure of the forwardmost film unit. At the 7 second input the Process Motor 108 output goes to 1 causing motor 108 to be energized thereby driving top roller 100. The motor runs for 2 seconds and is deenergized at the 9 second input which causes the Process Motor 108 output to go from 1 to 0. The 7 second input also causes the Pick output to go from 0 to 1, but the energization of solenoid 148 is delayed slightly by appropriate circuitry so that pick 126 is not activated until the processing roller 100 has come up to its proper speed. The Pick output goes from 1 to 0 at the 8 second input.

The exposed film unit 48 is advanced from cassette 50 by pick 126 and into the bite of processing rollers 100 and 102. The film unit advances through the rollers, through passageway 120 to exit slot 122, and through delivery chute 123 to the user in the studio compartment. The passage of the film unit through chute 123 is detected by photocell detector D which provides a logic output signal that is fed back to the Payment Receiver 46. This signal instructs the Payment Receiver 46 to accept the bill, coin, or token inserted therein. The Payment Receiver 46 is of the type that upon insertion of a bill, coin or token it provisionally accepts the bill, coin or token. That is, the coin return feature thereon is disenabled until the end of the picture taking cycle. If photocell detector D senses a picture delivery, the Payment Receiver accepts the bill, coin or token and resets.

At the 10 second input from Timer A, the Decoder — A Credit output goes from 0 to 1 and enables the coin return apparatus. If photocell detector D does not detect the ejection of a film unit, it does not give the accept command to the Payment Receiver 46. The Credit signal then allows the user to get a refund.

The 4 digit input signals representing count seconds 11 through 15 are not utilized by Decoder — A for picture taking cycle events.

The picture taking cycle just described was initiated by inserting a coin, bill or token into Payment Receiver 46. In a preferred embodiment, the Start Control may also be activated by a Test input signal provided for use by service personnel. Upon receiving the Test input signal, the Start Control will instruct the Timer A to start the count at 0. The Timer A will then run through the full 15 second picture taking cycle and reset.

The Start Control also may be activated by a Manual input signal. There may be occasions when it is desirable to set the photostudio up for manual initiation of the film exposure phase. For example, when a young child is to be photographed, it may be more practical for the parent to wait until the child is suitably posed and then actuate a switch which provides a Manual input signal to the Start Control instructing it to start the count at the 6 second mark such that Decoder — A responds by providing the Shutter and Strobe output. This bypasses the sequential indicia lights which operated during the first 5 seconds of the normal picture taking cycle initiated by activation of the Payment Receiver 46.

The logic system is designed to count the picture taking cycles and switch to a cassette changing cycle after the last (tenth) film unit 48 has been exposed and processed.

In a preferred embodiment a logic signal is provided in response to energization of the pick solenoid 148 and is fed to a UNIPULSER COUNTER and an ERROR DETECTOR.

The UNIPULSER COUNTER is basically a single decade counter which advances one count each time it receives the input logic signal supplied by the operation of the pick solenoid 148. It has a built-in rotating switch which advances one position for each input pulse and serves as an output to indicate the 0 to 10 picture count number. The UNIPULSER COUNTER also has an eleventh count position which is set upon receiving a second failure signal from the ERROR DETECTOR. This eleventh position serves as a shutdown of the entire logic system to disenable the operation of the photostudio until the logic system is manually reset by service personnel. The error detection and shutdown mode will be discussed later in this disclosure.

When the picture count reaches 10, the UNIPULSER COUNTER produces an output signal which serves as the input of a CASSETTE CHANGE CONTROL which functions to initiate and control a cassette changing cycle. The CASSETTE CHANGE CONTROL provides a run/stop output which serves as an input to a 16 second binary coded decimal Timer — B. Upon receiving the run/stop input Timer — B sequences through a 16 second cycle and then provides an end of cycle signal which is fed back to and resets the CASSETTE CHANGE CONTROL.

During the 16 second timing cycle, Timer — B puts out a two digit binary coded count number, which changes every four seconds and serves as an input to a Decoder — B that controls the operation of the elevator 154 and the shuttle plate member 228. The binary output signal from Timer — B begins at 00 and remains at 00 for count seconds 0, 1, 2, 3. At the 4 second count the output signal changes to 01; at the 8 second count it changes to 10, and at the 12 second count it changes to 11. Thus, the Decoder — B reads and functions in 4 second time blocks.

In addition to the two binary number inputs from Timer — B, Decoder — B receives 3 additional input signals from Photocell Detectors A, B, and C indicating, respectively, the left or first position of shuttle plate member 228, the right or second position of shuttle plate member 228, and the mid or third cassette receiving position of elevator car 292.

Decoder — B is a read only memory designated and has four outputs; up and down outputs for operating the Elevator Motor 340; and left and right outputs for the Shuttle Motor 272. The up and down outputs cause the energization of a bridge type drive circuit 501 which runs elevator motor 340. When the drive circuit 501 receives the up signal, the motor 340 is energized with the correct voltage polarity to cause it to rotate in a direction to drive the elevator car 292 up towards the camera receptacle 80. Conversely, the down signal causes motor 340 to be energized with the reverse voltage polarity by circuit 501 to drive it in the opposite direction. The left and right output signals for the shuttle plate member 228 likewise determine the polarity of the drive voltage applied by a drive circuit 502 to the shuttle motor 272.

Assume now that the elevator car 292 is in its first position holding a cassette 50 in the operative position within the camera receptacle and that the shuttle plate member 228 is in its left or first position shown in FIG. 8. The last picture in the cassette has been exposed and processed and the last pick signal into the UNI-PULSER COUNTER causes the count =10 output to be fed into CASSETTE CHANGE CONTROL.

The CASSETTE CHANGE CONTROL provides the run/stop signal to Timer — B which starts the 0 to 16 second count. The initial output binary number is 00 which is read by Decoder — B and in response thereto provides the down output signal for Elevator Motor 340. The Elevator Motor 340 is energized and car 292 moves downwardly from the first position to the second position. As it approaches the second position, the platform 220 has tilted sufficiently to cause the empty cassette 50 to slide off for disposal as previously described. The Elevator Motor 340 is energized for downward rotation for the full 4 second time block defined by the 00 input signal from Timer — B. However, the first and second positions of the elevator are determined by position stops in the linear actuator body 336 which limit the path of travel of the drive nut. That is, the elevator car 292 reaches the second position slightly before the end of the initial 4 second time block. The motor 340 at that point is in a stall mode because the lead screw cannot rotate any further. However, the current loading to the motors 340 and 272 is very small and the slight overdrive can be well tolerated.

At the 4 second count, the output of Timer — B changes to 01. Decoder — B responds by providing the up output signal causing the reversal of the voltage polarity and the energization of the motor 340 in the opposite direction driving elevator car 291 upwardly from the second position toward the third position. As car 292 moves upwardly, the counterbalanced platform 220 automatically resets to the cassette receiving position. When car 292 reaches the third position, the Photocell Detector C senses the interrupter tab 374 and provides a mid signal output which is fed into Decoder — B and cancels up output signal thereby deenergizing motor 340 to stop elevator car 292 in the mid or third position.

The Timer — B continues through the second 4 second time block count and at the 8 second count, the Timer — B output changes to 10. Decoder — B responds by providing either a left or right drive signal for the Shuttle Motor 272 depending on the input signals of Photocell Detector A and B. In this case the shuttle plate member 228 is to the left and Photocell Detector A senses the presence of the interrupter tab 370 and provides a left input signal to Decoder — B indicating that the shuttle plate member 228 is at the left position. Decoder — B responds to the left signal input by providing the right output signal. This causes the shuttle motor 272 to be energized with the correct voltage polarity to drive the shuttle plate member 228 to the right or the second position. The movement of shuttle plate 230 causes a cassette 50 dispensed onto the guide plate 216 from magazine 150 during the previous cassette changing cycle to be moved to the right and onto elevator platform 220 and also causes the bottom opening 174 of magazine 152 to be unblocked to effect the dispensing of a cassette 50 therefrom onto the guide plate 216.

During the next cassette changing cycle, Photocell Detector B will sense that the shuttle plate member 228 is in the right position and provide a right input signal to Decoder — B which will respond with a left output signal causing the movement of shuttle member 228 from the left position to the right position.

The movement of shuttle member 228 is accomplished during the third 4 second time block defined by Timer — B. At the 12 second count, the output of Timer — B switches to 11 and Decoder — B responds by providing the up signal output to Elevator Motor 340. The elevator car 292 then is driven from the third position to the first position and locates the full cassette 50 therein in camera receptacle 80.

At the end of the 16 second count, Timer — B provides an end of cycle signal output which resets the CASSETTE CHANGE CONTROL. In response to the reset signal the CASSETTE CHANGE CONTROL provides two output signals. One goes to the Start Control and causes it to command Timer — A to start the output at count number 9. The other output signal is the mode signal which is fed into Decoder — B and instructs it to operate in the preprogrammed cassette changing mode in response to the 4 digit binary input count number.

Upon receiving the count number 9 from Timer — A Decoder A responds by providing the Process Motor 108 output and Pick output slightly thereafter to cause the dark slide in the newly introduced cassette 50 to be ejected therefrom. It also provides the Dark Slide output signal which causes the solenoid 360 to be energized thereby moving the door 354 in chute 123 from the normally closed position for film delivery to its open position for dark slide disposal. The Timer — A runs through to the 15 second count and then resets the Start Control. This event cancels the mode command signal to Decoder A to operate in the cassette changing mode and it is reset to operate in the picture taking mode.

It will be noted that the pick signal fed into the UNIPULSER COUNTER during the dark slide ejection serves as a means for reseting the UNIPULSER COUNTER back to the 0 count position.

The illustrated logic system also is designed to sense certain system failures and take corrective action including the shutdown of the logic system.

Each pick output signal cassette by the energization of pick solenoid 148 is fed into the ERROR DETECTOR along with an output signal from Photocell Detector D. For each operation of the pick 126, the Photocell Detector D should sense the passage of a film unit 46, if the logic system operating in the picture taking mode, or a dark slide if operating in a cassette changing mode. If both of the output signals are received by the ERROR DETECTOR, there is no error in the system and therefore there is no output signal from the ERROR DETECTOR.

Assume for example, however, that a cassette 50 is located in camera receptacle 80 and has a 5 film units 48 left therein. The photostudio is actuated by a user and proceeds through a picture taking cycle but the exposed film unit 48 for some reason is not able to be advanced from the cassette 50 into the pressure applying rollers 100 and 102 upon actuation of pick 120. The ERROR DETECTOR would receive the pick output signal but would not receive an output signal from Photocell Detector D. This condition causes the ERROR DETECTOR to respond with a first failure signal that is fed into an Automatic Cassette Change system which responds with a cassette change output signal that is fed into the CASSETTE CHANGE CONTROL to initiate the cassette changing cycle as previously described. The ERROR DETECTOR now stores the information that there has been a first failure. If during the cassette changing cycle of the pick and/or rollers fails to eject the dark slide, then the pick output signal is received by the ERROR DETECTOR without the accompanying output signal from Photocell Detector D and the second consecutive error is noted by the ERROR DETECTOR and it responds with a second failure output signal which is fed to the UNIPULSER COUNTER. This signal sets the UNIPULSER COUNTER in the previously noted eleventh position which shuts down the logic system to disenable further operation of the photostudio until the logic system is reset by a service technician who actuates the Manual Change Switch to provide an input into the CASSETTE CHANGE CONTROL.

It will be noted that the error detection system is used also to shut down the logic system when all of the cassettes 50 have been expended.

Assume the last cassette 50 is in the camera receptacle 80 and the last film unit 48 has been exposed and processed. The UNIPULSER COUNTER provides the count =10 signal and a cassette changing cycle begins. The logic system operates as it normally would. The last event in the cycle is the detection of the dark slide by Photocell Detector D. Since there is no cassette 50 in the receptacle 80, there is no dark slide to eject. The ERROR DETECTOR receives the pick output signal but does not receive a dark slide sensing signal from Photocell Detector D. The ERROR DETECTOR responds with the first failure signal causing the initiation of another cassette changing cycle. This second cycle also does not provide the dark slide sensing signal therefore the ERROR DETECTOR notes the second failure and feeds the second failure output signal to the UNIPULSER COUNTER causing the system to shut down.

Since certain changes may be made in the above apparatus without departing from the scope of the invention herein involved, it is intended that all matter contained in the above-described description and shown in the accompanying drawings shall be interpreted as illustrative and not in a limiting sense.

What is claimed is:

1. A cassette changing apparatus operable during a cassette changing cycle of operation for changing a film cassette in a camera of the type including a receptacle for receiving a film cassette holding a stack of film units therein and for locating the cassette in operative relation with the camera for exposing the forwardmost film unit in the stack, the camera receptacle having an opening therein for admitting and removing such a cassette, said cassette changing apparatus comprising:

first and second cassette holding magazines each configured to hold a stack of such cassettes therein and including an opening through which the cassettes are adapted to be dispensed sequentially for transfer to the camera receptacle;

a cassette carrier mounted for movement toward and away from the camera receptacle between operative positions including a cassette receiving position and being operable during a cassette changing cycle for removing an empty film cassette from the receptacle through the receptacle opening, effecting the disposal of the empty cassette, receiving a full cassette initially held in one of said first and second magazines and moving the full cassette through the receptacle opening and into its operative position within the receptacle;

guide means for guiding the movement of the cassettes dispensed thereonto from said first and second magazines to said cassette carrier located in said cassette receiving position; and means operable during a cassette changing cycle for effecting the dispensing of a cassette from one of said first and second magazines onto said guide means and for moving a cassette, dispensed onto said guide means from the other of said first and second magazines during the preceding cassette changing cycle, along said guide means and into operative relation with said cassette carrier located in said cassette receiving position, said means for effecting the dispensing of a cassette being operable to cause a cassette to be dispensed alternately from said first and second magazines during successive cassette changing cycles.

2. The cassette changing apparatus of claim 1 wherein said means for effecting the dispensing of a cassette include means for alternately blocking and unblocking the openings in said first and second magazines during successive cassette changing cycles.

3. A cassette changing apparatus as defined in claim 1 wherein said means for effecting the dispensing of a cassette and for moving a cassette along said guide means includes reciprocating means mounted for reciprocating movement relative to said guide means and said openings in said first and second magazine between first and second terminal positions, said reciprocating means being configured to move from one said terminal position to the other said terminal position only once during each cassette changing cycle.

4. The cassette changing apparatus as defined in claim 3 wherein said reciprocating means unblocks said opening in said first magazine to effect the dispensing of a cassette therefrom and blocks said opening in said second magazine to prevent a cassette from being dispensed therefrom when said reciprocating means is located in said first terminal position and unblocks said opening in said second magazine to effect the dispensing of a cassette therefrom and blocks said opening in said first magazine to prevent a cassette from being dispensed therefrom when said reciprocating means is located in said second terminal position.

5. The cassette changing apparatus of claim 4 wherein said reciprocating means engages a cassette dispensed onto said guide means from said first magazine as a result of said reciprocating means being located in said first terminal position and moves the cassette along said guide means and into operative relation with said cassette carrier located in said cassette receiving position when said reciprocating means moves from said first terminal position to said second terminal position during one cassette changing cycle and engages a cassette dispensed from said second magazine during said one cassette changing cycle as a result of said reciprocating means being located in said second terminal position and moves the cassette along said guide means into operative relation with the cassette carrier located in said cassette receiving position when said reciprocating means moves from said second terminal position to said first terminal position during the next cassette changing cycle following said one cassette changing cycle.

6. A cassette changing apparatus as defined in claim 1 wherein said operative positions of said cassette carrier include a first position closest to the camera receptacle wherein said carrier holds a cassette thereon at its operative position within the receptacle, a second position furthest from said receptacle wherein said carrier effects the disposal of an empty cassette removed from the receptacle when said carrier moves from said first position toward said second position, and a third position corresponding to said cassette receiving position intermediate said first and second positions.

7. The cassette changing apparatus of claim 6 wherein said cassette carrier includes a platform member for receiving and supporting a cassette, said platform member being mounted for pivotal movement between a cassette supporting position wherein said platform member supports a cassette thereon and a tilted position wherein said platform member is inclined with respect to said cassette supporting position causing a cassette thereon to slide off said platform member to effect the disposal of the cassette and said cassette changing apparatus further includes means for effecting the movement of said platform member from said supporting position to said tilted position as said carrier moves from said third position toward said second position.

8. The cassette changing apparatus of claim 7 wherein said platform member is counter balanced to automatically return from said tilted position to said supporting position as said carrier moves from said second position toward said third position.

9. The cassette changing apparatus of claim 1 wherein the cassettes are adapted to be loaded into said first and second magazines in a predetermined orientation relative thereto and said first and second magazines each include an access opening through which the cassettes are adapted to be inserted for loading and means for admitting the passage of a cassette through said access opening only when the cassette is in the correct predetermined orientation and for preventing the passage of a cassette through said access opening when the cassette is not in the correct predetermined orientation.

10. A cassette changing apparatus operable during a cassette changing cycle of operation for changing a film cassette in a camera of the type including a receptacle for receiving a film cassette holding a stack of film units therein and for locating the cassette in operative relation with the camera for exposing the forwardmost film unit in the stack, the receptacle having an opening at the bottom thereof for admitting and removing such a cassette, said cassette changing apparatus comprising:

first and second cassette holding magazines each configured to hold a stack of such cassettes therein and having an opening at the bottom through which the cassettes are adapted to be sequentially dispensed by gravity for transfer to the camera receptacle, said first and second magazines being disposed on opposite sides of the camera with their respective said bottom openings adjacent and on opposite sides of the bottom opening of the camera receptacle;

an elevator including an elevator car for receiving cassettes initially held in said first and second magazines and for moving such cassettes into and out of the camera receptacle, said elevator car being mounted in alignment with the bottom opening of the receptacle for movement toward and away from the receptacle between a first position closest to the receptacle wherein said elevator car holds a cassette thereon in the receptacle in operative relation with the camera, a second position furthest from the receptacle for effecting the disposal of an empty cassette thereon removed from the receptacle by moving said elevator car from said first position toward said second position and a third position intermediate said first and second positions for receiving a full cassette for subsequent movement into the receptacle;

guide means disposed on opposite sides of said elevator car located in said third position and extending outwardly therefrom beneath said bottom openings of said first and second magazines for receiving cassettes dispensed from said first and second magazines and guiding the movement of such cassettes onto said elevator car located in said third position; and reciprocating means disposed between said guide means and said bottom openings of said first and second magazines and being mounted for reciprocating movement relative thereto between first and second terminal positions for alternately unblocking and blocking the bottom openings of said first and second magazines during successive cassette changing cycles to effect the dispensing of a cassette alternately from said first and second magazines onto said guide means during successive cassette changing cycles and for moving a cassette, dispensed onto said guide means during a cycle of operation preceding each said successive cycle of operation, along said guide means and onto said elevator car located in said third position.

11. The cassette changing apparatus of claim 10 wherein said reciprocating means includes a shuttle plate having first and second openings therein located between opposite first and second end portions of said shuttle plate, said first opening being aligned with said bottom opening in said first magazine for unblocking said bottom opening therein to effect the dispensing of a cassette therefrom onto said guide means and said second end portion being aligned with said bottom opening in said second magazine for blocking said bottom opening therein to prevent a cassette from being dispensed therefrom when said shuttle plate is located in said first terminal position and said second opening in said shuttle plate being located in unblocking relation to said bottom opening of said second magazine to effect the dispensing of a cassette therefrom onto said guide means and said first end portion being located in blocking relation to said bottom opening in said first magazine to prevent a cassette from being dispensed therefrom when said shuttle plate is located in said second terminal position.

12. The cassette changing apparatus of claim 11 wherein said means for moving a cassette along said guide means to said elevator car located in said third position include portions of said shuttle plate defining certain edges of said first and second openings in said shuttle plate.

13. The cassette changing apparatus of claim 10 wherein said elevator car includes a platform for receiving and supporting a cassette, said platform member being mounted for pivotal movement between a cassette supporting position wherein said platform member supports a cassette thereon and a tilted position wherein said platform member is inclined with respect to said supporting position thereby causing a cassette thereon to slide off said platform member to effect the disposal of the cassette and said cassette changing apparatus further includes means for effecting the movement of said platform member from said supporting position to said tilted position in response to moving said elevator car from said third position toward said second position.

14. The cassette changing apparatus of claim 13 wherein said platform member is counterbalanced to automatically return from said tilted position to said supporting position in response to moving said elevator car from said second position to said third position.

15. The cassette changing apparatus as defined in claim 10 further including drive means for driving and reciprocating means between said first and second terminal positions.

16. The cassette changing apparatus as defined in claim 15 wherein said drive means includes a linear actuator coupled to said reciprocating means and said linear actuator includes a reversible motor, said motor being adapted to rotate in one direction to effect the driving of said reciprocating means from said first terminal position to said second terminal position and to rotate in a direction opposite said one direction to effect the driving of said reciprocating means from said second terminal position to said first terminal position.

17. The cassette changing apparatus as defined in claim 10 further including drive means for driving said elevator car between said first, second and third positions and said elevator car drive means includes a linear actuator coupled to said elevator car and said linear actuator includes a reversible motor adapted to rotate in one direction for effecting the driving of said elevator car towards the camera receptacle and to rotate in a direction opposite said one direction to effect the driving of said elevator car away from the camera receptacle.

18. The cassette changing apparatus of claim 17 further including means for detecting the location of said elevator car at said third position, when said elevator car moves from said second position to said third position and means for disenabling the operation of said motor to maintain said elevator car in said third position until a cassette is moved onto said elevator car.

19. The cassette changing apparatus of claim 10 wherein the cassettes are adapted to be loaded into said first and second magazines in a predetermined orientation relative thereto and said first and second magazines each further include an access opening through which the cassettes are adapted to be inserted for loading and means for admitting the passage of a cassette through said access opening only when the cassette is in the correct predetermined orientation and for preventing the passage of a cassette through said access opening when the cassette is not in the correct predetermined orientation.

20. A cassette changing apparatus as defined in claim 10 wherein said reciprocating means is configured to move from one of said terminal positions to the other said terminal position only once during each cassette changing cycle of operation.

21. An automatic photostudio for use with film cassettes having a stack of self-developing film units therein, an exposure aperture in the cassette through which the forwardmost film unit in the stack is exposed, and a film withdrawal slot through which the film unit is withdrawn from the cassette for processing said photostudio comprising:

a housing divided into a studio compartment where a user sits to be photographed and an apparatus compartment;

a camera located in said apparatus compartment and including an open bottom receptacle for receiving such a cassette and for locating the cassette such that the forwardmost film unit in the stack is in position for exposure, exposure means for effecting the exposure of a film unit located at said exposure position, pressure applying means for applying pressure progressively along the length of the film unit to distribute a processing fluid within the film unit, and film advance means for advancing the film unit through the withdrawal slot and into operative relation with said pressure applying means;

means for defining an optical path between a said studio compartment and said exposure means of said camera located in said apparatus compartment to effect the photographing of a user sitting in said studio compartment; and a cassette changing apparatus located in said apparatus compartment and being operable during a cassette changing cycle of operation to change a cassette in said camera receptacle, said cassette changing apparatus including:

first and second cassette holding magazines each configured to hold a stack of such cassettes therein and having an opening at the bottom through which the cassettes are adapted to be sequentially dispensed by gravity for transfer to said camera receptacle, said first and second magazines being disposed on opposite sides of said camera with their respective said bottom openings adjacent and on opposite sides of said bottom opening of said camera receptacle;

an elevator including an elevator car for receiving cassettes initially held in said first and second magazines and for moving such cassettes into and out of said camera receptacle, said elevator car being mounted in alignment with the bottom opening of said receptacle for movement toward and away from said receptacle between a first position closest to said receptacle wherein said elevator car holds a cassette thereon in said receptacle in operative relation with said camera, a second position furthest from the receptacle for effecting the disposal of an empty cassette thereon removed from said receptacle by moving said elevator car from said first position toward said second position, and a third position intermediate said first and second positions for receiving a full cassette for subsequent movement into the receptacle;

guide means disposed on opposite sides of said elevator car located in said third position and extending outwardly therefrom beneath said bottom openings of said first and second magazines for receiving cassettes dispensed from said first and second magazines and guiding the movement of such cassettes onto said elevator car located in said third position; and reciprocating means disposed between said guide means and said bottom openings of said first and second magazines and being mounted for reciprocating movement relative thereto between first and second terminal positions for alternately unblocking and blocking the bottom openings of said first and second magazines during successive cassette changing cycles to effect the dispensing of a cassette alternately from said first and second magazines onto said guide means during successive cassette changing cycles and for moving a cassette, dispensed onto said guide means during a cycle of operation preceding each said successive cycle of operation, along said guide means and onto said elevator car located in said third position.

22. An automatic photostudio as defined in claim 21 wherein said reciprocating means includes a shuttle plate having first and second openings therein located between opposite first and second end portions of said shuttle plate, said first opening being aligned with said bottom opening in said first magazine for unblocking said bottom opening therein to effect the dispensing of a cassette therefrom onto said guide means and said second end portion being aligned with said bottom opening in said second magazine for blocking said bottom opening therein to prevent the dispensing of a cassette therefrom when said shuttle plate is located in said first terminal position and said second opening in said shuttle plate being located in unblocking relation to said bottom opening in said second magazine to effect the dispensing of a cassette therefrom onto said guide means and said first end portion of said shuttle plate being located in blocking relation to said bottom opening in said first magazine to prevent a cassette from being dispensed therefrom when said shuttle plate is located in said second terminal position.

23. An automatic photostudio as defined in claim 22 wherein said means for moving a cassette along said guide means to said elevator car located in said third position include portions of said shuttle plate defining certain edges of said first and second openings in said shuttle plate.

24. An automatic photostudio as defined in claim 21 wherein said elevator car includes a platform for receiving and supporting a cassette, said platform being mounted for pivotal movement between a cassette supporting position wherein said platform supports a cassette thereon and a tilted position wherein said platform is inclined with respect to said cassette supporting position causing a cassette thereon to slide off said platform to effect the disposal of the cassette and said automatic photostudio further includes means for effecting the movement of said platform from said supporting position to said tilted position in response to moving said elevator car from said third position toward said second position.

25. An automatic photostudio as defined in claim 24 wherein said platform is counterbalanced to automatically return from said tilted position to said cassette supporting position in response to moving said elevator car from said second position toward said third position.

26. An automatic photostudio as defined in claim 21 further including means for controlling and coordinating the operation of said camera and said cassette changing apparatus.

27. An automatic photostudio as defined in claim 21 further including first drive means for driving said elevator car between said first, second, and third positions and second drive means for driving said reciprocating means between said first and second terminal positions and means for controlling and coordinating the operation of said first and second drive means.

28. An automatic photostudio as defined in claim 27 wherein said first and second drive means each include reversible electric motors and said control means includes means for detecting the position of said reciprocating means and said elevator car and applying appropriate voltage polarities to said reversible electric motors to coordinate the operation of said elevator car and said reciprocating means during a cassette changing cycle.

29. An automatic photostudio as defined in claim 21 further including a film delivery chute extending from a film exit slot on said camera in said apparatus compartment to said studio compartment for delivering a film unit along a predetermined path of travel from the camera to said studio compartment and means for diverting a dark slide, initially held in a cassette and advanced through said film exit slot into said delivery chute, from said predetermined path of travel such that the dark slide is removed from said delivery chute before reaching said studio compartment for disposal within said apparatus compartment.

30. An automatic photostudio as defined in claim 21 further including at least two lamp illuminated indicia in said studio compartment which are adapted to be illuminated in sequence by at least two individual lamps for alerting the user to prepare himself for having his picture taken.

* * * * *